United States Patent
Nishimura

(10) Patent No.: US 7,088,356 B2
(45) Date of Patent: Aug. 8, 2006

(54) POWER SOURCE CIRCUIT

(75) Inventor: Motoaki Nishimura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 453 days.

(21) Appl. No.: 10/719,893

(22) Filed: Nov. 21, 2003

(65) Prior Publication Data

US 2004/0141342 A1 Jul. 22, 2004

(30) Foreign Application Priority Data

Nov. 25, 2002 (JP) ............................. 2002-340884

(51) Int. Cl.
*G09G 3/18* (2006.01)
(52) U.S. Cl. ....................... 345/211; 327/356
(58) Field of Classification Search ................ 345/210, 345/211, 212; 326/83; 327/534, 535, 536
See application file for complete search history.

(56) References Cited

U.S. PATENT DOCUMENTS

| | | | |
|---|---|---|---|
| 5,986,649 A * | 11/1999 | Yamazaki .................... | 345/211 |
| 6,097,161 A * | 8/2000 | Takano et al. ............... | 315/291 |
| 6,236,394 B1 | 5/2001 | Ikeda | |
| 6,384,668 B1 * | 5/2002 | Kuroda ........................ | 327/536 |
| 6,396,772 B1 | 5/2002 | Yabe et al. | |
| 6,459,327 B1 * | 10/2002 | Yamada et al. ............. | 327/534 |
| 6,650,172 B1 * | 11/2003 | Shingyouchi ............... | 327/536 |
| 6,906,577 B1 * | 6/2005 | Kim ............................ | 327/536 |
| 6,960,955 B1 * | 11/2005 | Nonaka ....................... | 327/536 |
| 2004/0080340 A1 * | 4/2004 | Hidaka ........................ | 326/83 |
| 2005/0007186 A1 * | 1/2005 | Kamijo ....................... | 327/536 |
| 2005/0190613 A1 * | 9/2005 | Kim ....................... | 365/189.09 |
| 2005/0225377 A1 * | 10/2005 | Kobayashi et al. ......... | 327/536 |

FOREIGN PATENT DOCUMENTS

| | | |
|---|---|---|
| JP | 03-118758 | 5/1991 |
| JP | 2001-286125 | 10/2001 |
| JP | 2001-309642 | 11/2001 |
| JP | 2004-096881 | 3/2004 |
| WO | 98/44621 | 10/1998 |
| WO | 00/41041 | 7/2000 |

* cited by examiner

*Primary Examiner*—Amare Mengistu
(74) *Attorney, Agent, or Firm*—Hogan & Hartson LLP

(57) ABSTRACT

A power source circuit includes a power source wiring at a high potential side provided with a first power source voltage and a second power source voltage, a power source wiring at a low potential side and booster circuit as a charge pump installed between the power source wiring at a high potential side and the power source wiring at a low potential side and provided with a plurality of switching transistors and a plurality of capacitors. A control device is provided for controlling the booster circuit. A predetermined number of power sources includes the power source wiring at the high potential side are further provided with the power source circuit. An input voltage is selectively input to a part of the booster circuit from any one of the predetermined number of power sources. The control device fixes all of the switching transistors inputting the predetermined number of power sources except one of the switching transistors and the control device controls the booster circuit to implement a boosting operation by switching the switching transistor not fixed with a predetermined frequency and a predetermined phase relationship so as to switch the input of the predetermined number of power sources and selectively output a predetermined number of output voltages from the booster circuit.

20 Claims, 13 Drawing Sheets

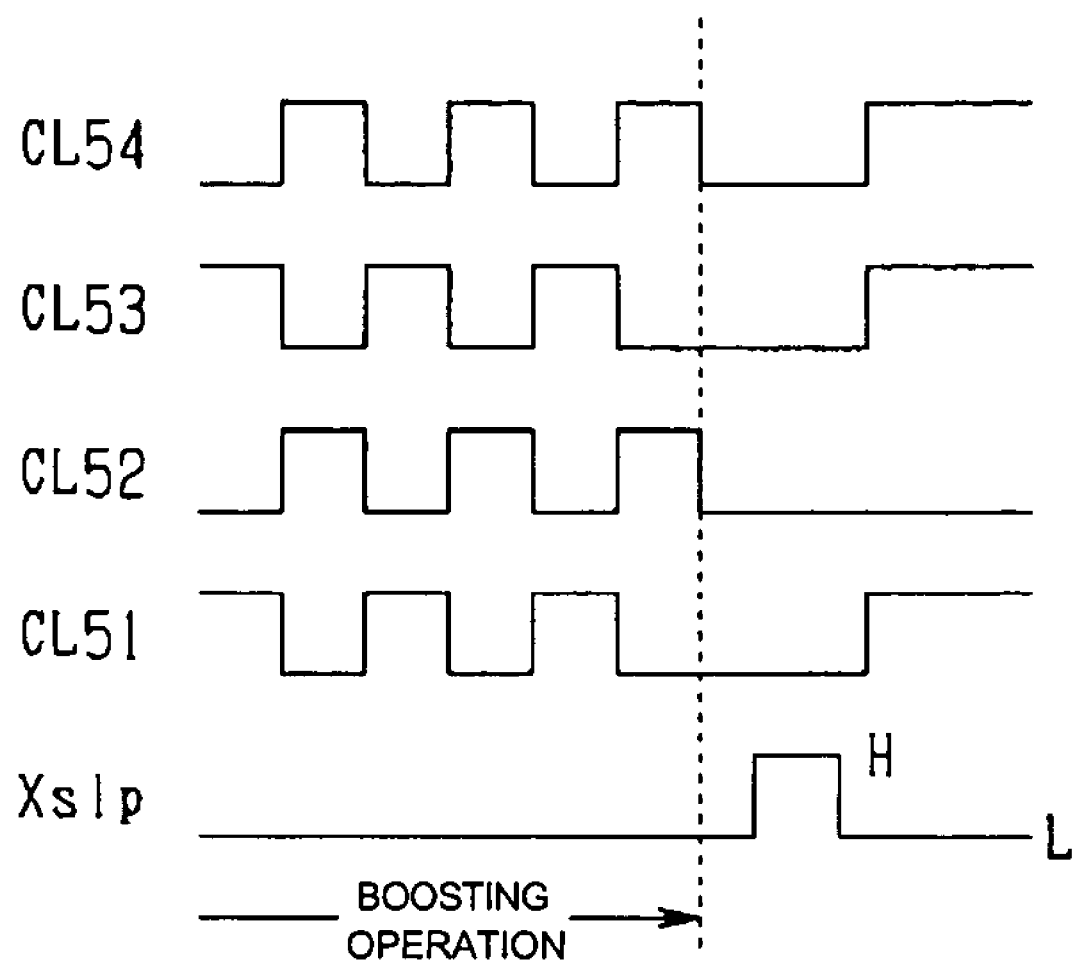

POWER SOURCE CIRCUIT

BACKGROUND OF THE INVENTION

1. Field of the Invention

The present invention relates to a power source circuit, and, more particularly, to a power source circuit provided with a booster circuit and with switching an input voltage to the booster circuit without using a switching circuit.

2. Description of Related Art

In general, a device for driving a liquid crystal display needs a high voltage power source for driving a liquid crystal and this high driven voltage power source is generally provided with a booster circuit such as a DC—DC conversion system.

In this voltage power source for a driver of the liquid crystal display, two kinds of voltages, a first voltage V1 (2.6V, for example) and a second voltage VC (1.3V, for example), which is lower than the second voltage, are prepared as power source voltages and one of these two voltages V1 or VC is switched by using a switching circuit in order to form various voltages of response to loads in various functions of the liquid crystal display.

However, in the power source circuit for the driver of the liquid crystal display, the switching circuit for switching an input voltage is arranged in a former stage and a booster circuit is arranged in a latter stage such that there is a problem where an output impedance of the booster circuit is increased by an effect of a switching resistance from switching transistors constituting the switch circuit.

Therefore, in view of the above problem, the present invention is intended to provide a power source circuit that is capable of switching an input voltage into a booster circuit without a switching circuit and decreasing an input impedance of the booster circuit as much as possible.

SUMMARY OF THE INVENTION

A power source circuit of the present invention includes a power source voltage at a high potential side provided with a first power source voltage and a second power source voltage, a power source voltage at a low potential side, a booster circuit as a charge pump that is installed between a power source voltage at a high potential side and provided with a plurality of switching transistors and a plurality of capacitors and a control device controlling the booster circuit. A predetermined number of power sources including the power source voltage at the high potential side are further provided with the power source circuit. Further, an input voltage is selectively input to a part of the booster circuit from any one of the predetermined number of power sources and the control device fixes other transistors to be at an "off" state except one transistor in the plurality of transistors inputting the predetermined number of power sources among the plurality of the switching transistors. The control device controls the booster circuit to implement a boosting operation by switching all the fixed transistors except transistors fixed to be at an "off" state with a predetermined frequency and a predetermined phase relationship so as to switch the input of the predetermined number of power sources and selectively output a predetermined number of output voltages from the booster circuit.

According to this aspect of the invention, of the plurality of transistors capable of inputting the predetermined power sources among the plurality of transistors regarding the charge pumping operation, other transistors except the one transistor is fixed to be in an "off" state. Hence, any predetermined power source voltages can be switched and inputted to the booster circuit and the output impedance of booster circuit can be decreased. It is possible to switch the input of three or more power source voltages.

Further, a power source circuit of the present invention includes a power source voltage at a high potential side provided with a first power source voltage and a second power source voltage, a power source voltage at a low potential side, and a booster circuit as a charge pump that is installed between the power source voltage at a high potential side and the power source voltage at a low potential side and provided with a plurality of switching transistors and a plurality of capacitors. One of the first power source voltage or the second power source voltage is switched and inputted to a part of the booster circuit and a first output voltage or a second output voltage, which are boosted based on the first power source voltage or the second power source voltage respectively, is outputted. A control device that controls fixing transistors inputting the first power source voltage or the second power source voltage among the switching transistors of the booster circuit to be at an "off" state, and switching other transistors with a predetermined frequency so as to make the booster circuit implement a boosting operation and the booster circuit output the first output voltage or the second output voltage by switching and inputting one of the first power source voltage or a second power source voltage to a part of the booster circuit.

According to this aspect of the invention, of the plurality of transistors capable of inputting the predetermined power sources among the plurality of transistors regarding the charge pumping operation, transistors inputting the first and the second power source voltage are fixed to be at an "off" state. Hence, any of the first or the second power source voltages can be switched and inputted to the booster circuit and the output impedance of booster circuit can be decreased.

In addition, in the present invention, the booster circuit may further includes a multi stage booster circuit having multiple boosting stages. The number of the multiple stages are decreased by short-circuiting an output terminal of the multi stage booster circuit with a output terminal of a capacitor at least constituting a final stage of the booster circuit and removing the capacitor.

According to this aspect of the present invention, it is possible to select an input voltage from a plurality of power source voltages and a numbers of stages for boosting. Then, it is possible to generate a plurality of output voltages.

In addition, in the present invention, the booster circuit may further include a multi stage booster circuit having multiple boosting stages. An output terminal of a capacitor in at least one stage except the final stage of the multi stages booster circuit is connected to an output capacitor via a transistor so as to fetch out a potential of the one stage as a stabilized potential from the output capacitor.

According to this aspect of the present invention, it is possible to fetch out an output voltage not only from the final stage but a stage on the way. Further, it is possible to generate an output voltage, corresponding to an output voltage at a stage on the way except the final stage without installing a specific booster circuit.

Further, a power source circuit of the present invention includes a power source voltage at a high potential side provided with a first power source voltage and a second power source voltage, a power source voltage at a low potential side, and a multi stage booster circuit as a charge pump that is installed between the power source voltage at a high potential side and the power source voltage at a low potential side and provided with a plurality of switching transistors and a plurality of capacitors to generate a output voltage, which are multistage boosted based on the power source voltage at the high potential side. A control device controls the booster circuit to implement a boosting operation by switching the plurality of switching transistors in the booster circuit with a predetermined frequency and a predetermined phase relationship. The number of multiple stages of the multi stage booster circuit is decreased by short-circuiting an output terminal of the multi stage booster circuit with an output terminal of a capacitor at least constituting a final stage of the booster circuit and removing the capacitor.

According to this aspect of the present invention, after designing a maximum number of boosting stages in a multiple stage boosting circuit, the number of boosting stages can be decreased depending on actual conditions, so as to select an appropriate level of an output voltage.

Further, a power source circuit of the present invention includes a power source voltage at a high potential side provided with a first power source voltage and a second power source voltage, a power source voltage at a low potential side, and a multi stages booster circuit as a charge pump that is installed between the power source voltage at a high potential side and the power source voltage at a low potential side and provided with a plurality of switching transistors and a plurality of capacitors to generate a output voltage, which are multistage-boosted based on the power source voltage at the high potential side. A control device controls the booster circuit to boost a voltage by switching the plurality of switching transistors in the booster circuit with a predetermined frequency and a predetermined phase relationship. An output terminal of a capacitor in at least one stage except the final stage of the multi stage booster circuit is connected to an output capacitor so as to fetch out the potential of the one stage as a stabilized potential from the output capacitor.

According to this aspect of the present invention, it is possible to fetch out an output voltage not only from the final stage but a stage on the way. Further, it is possible to generate an output voltage, corresponding to an output voltage at a stage on the way except the final stage without installing a specific booster circuit.

Further, a power source circuit of the present invention includes a power source voltage at a high potential side provided with a first power source voltage and a second power source voltage, a power source voltage at a low potential side, and a booster circuit as a charge pump that is installed between the power source voltage at a high potential side and the power source voltage at a low potential side and provided with a plurality of switching transistors and a plurality of capacitors. A control device controls the booster circuit to implement a boosting operation by switching the plurality of the switching transistors with a predetermined frequency and a predetermined phase relationship and outputting a first output voltage. The control device controls fixing some of the plurality of switching transistors to be at an "on" state and the rest of the plurality of switching transistors to be at an "off" state so as to make the booster circuit output a second output voltage which is equivalent to the power source voltage at the high potential side.

According to this aspect of the present invention, it is possible to output the necessary first output voltage by boosting the power source voltage at the high potential side and output the second output voltage which is equivalent to the power source voltage at the high potential side. If this power source circuit is employed to a segment voltage generation circuit for a fundamental driving method by a liquid crystal driver, the first output voltage, which is necessary for a segment voltage, can be generated, while the segment of the voltage can be equivalent to the power source voltage (the second voltage) which is usable as the common voltage. It is also possible to produce a state called a non bias state when the image displaying is "off" by equalizing the segment voltage of a liquid crystal with the common voltage.

BRIEF DESCRIPTION OF DRAWINGS

FIG. 18 is a timing chart that shows a circuit operation in FIG. 16.

DETAILED DESCRIPTION OF THE PREFERRED EMBODIMENTS

A mode for carrying out the invention is described along with the drawings. In the preferred embodiments, a booster circuit used in a driver for driving a liquid crystal is described. This is applied to all the preferred embodiments described thereafter.

Figures 1, 2:
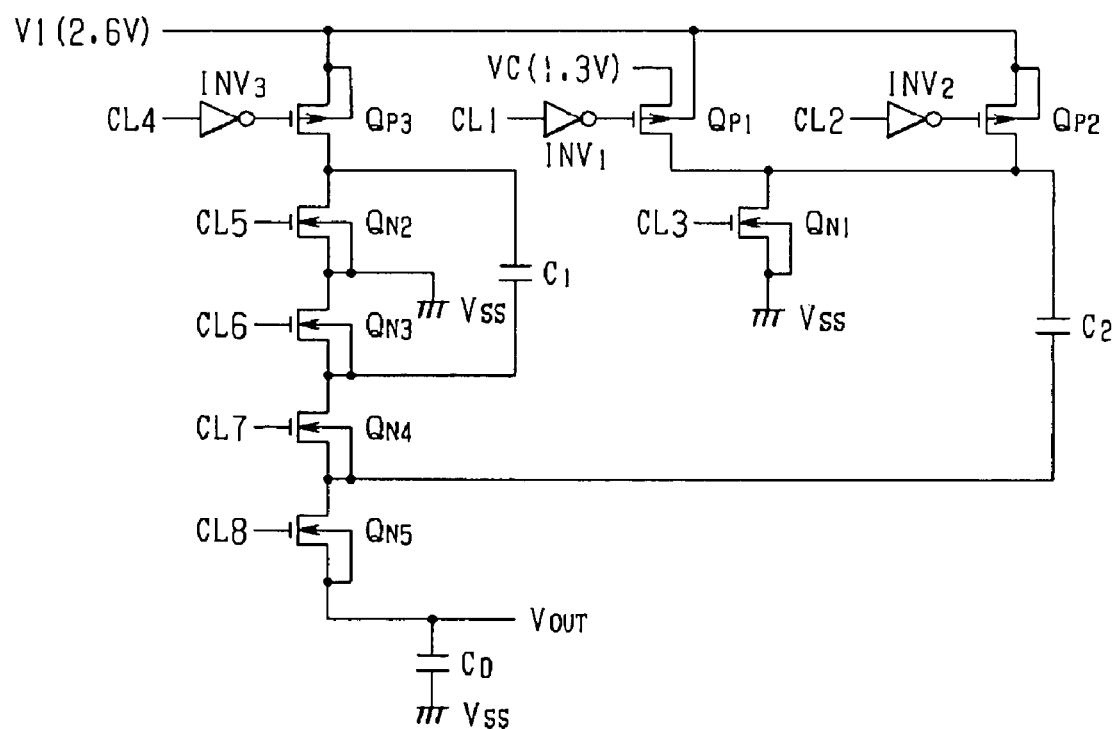
FIG. 1 is a diagram that shows a power source circuit of the first embodiment of the present invention.
FIG. 2 is a timing chart that shows the operation of the circuit in FIG. 1.

FIG. 1 is a circuit diagram showing a power source circuit of a first embodiment of the present invention.

In this first embodiment, a double stage booster circuit with a negative direction is explained as an example.

The booster circuit shown in FIG. 1 is a booster circuit as a charge pumping system that is installed between a power source voltage V1 at a high potential side and a power source voltage VSS at a low potential side and provided with switching transistors QP1 to QP3 and QN1 to QN5 and a plurality of (three in the drawing) capacitors C1, C2, C0. A predetermined number (two in this diagram) of source voltages V1 and VC including source voltage V1 at the high potential side are prepared as input voltages to a part of the booster circuit. One of the predetermined number of the source voltages V1 or VC is selectively switched and inputted. Based on the source voltage V1 at the high potential side and the selectively switched and inputted source voltage V1 or VC, it is possible to selectively output one of the predetermined number (2 in this diagram) of boosted output voltages −2V1 and −V1, −VC.

Then, of the plurality of transistors QP1 and QP2 capable of inputting the predetermined number of the source voltages V1 and VC among the plurality of switching transistors QP1 to QP3 and QN1 to QN5 in the booster circuit, a control means fixes other transistors (for example, QP1) except one transistor (for example, QP2, QP1 or QP2 for example) to be in an "off" state. Further, the control means controls the booster circuit to implement a boosting operation by switching all transistors except the fixed transistors to be in an "off" state (transistors QP2, QP3, QN1 to QN5 except QP1 for example) with a predetermined frequency and a predetermined phase relationship. Thus, it is possible to selectively output one of the predetermined number of the output voltages −2V1 and −V1, −VC from the booster circuit by switching one of the predetermined number of the input power source voltages V1 or VC, which are prepared for input to a part of the boosting circuit.

Namely, the first source voltage V1 at the high potential side (2.6V, for example) or the second source voltage VC (1.3V, for example) is switched and inputted as an input voltage. Then, it is possible to generate and output the first output voltage VOUT (−5.2V, for example) that is boosted based on the first power source voltage V1 as an output voltage. Thus, it is possible to generate and output the first output voltage VOUT (−3.9V for example) that is boosted based on the first power source voltage V1 and the second power source voltage VC.

Here, in the first embodiment, two input voltages V1 and VC are prepared and switched. But, it is possible to prepare and switch three or more input voltages. In case of preparing and switching three or more input voltages, a plurality of transistors inputting these three or more input voltages are prepared. It is necessary to control fixing other transistors except the one transistor for the inputting and switching operation to be "off" and implementing a boosting operation by switching all switching transistors except the fixed transistors to be "off" in the booster circuit with a predetermined frequency and a predetermined phase relationship.

The structure shown in FIG. 1 is described in detail.

In the booster circuit in FIG. 1, a P channel transistor QP2 and a N channel transistor QN1 are connected in series between the first power source voltage V1 at the high potential side and the potential VSS at the low potential side. In parallel with these, a P channel transistor QP3 and a N channel transistor QN2 are connected in series. The P channel transistor QP2 is a transistor that can input the first source voltage V1. The first source voltage V1 is always supplied to the P channel transistor QP3.

In addition, the P channel transistor QP1 is connected to the P channel transistor QP2 in parallel. This P channel transistor QP1 is a transistor that can input the second source voltage VC.

In the P channel transistor QP2, the source and the substrate are commonly connected. The first source voltage V1 (2.6V, for example) is input into the source and the clock signal CL2 is supplied to the gate from the control means via an inverter INV2. The drain of the P channel transistor QP2 is connected to the drain of the N channel transistor QN1. In the N channel transistor QN1, the source and the substrate are commonly connected to the reference potential VSS.

In the P channel transistor QP1, the second source voltage VC (1.3V, for example) is input into the source, the clock signal CL1 is supplied to the gate via the inverter INV1 and the drain is connected to the drain of the N channel transistor QN1.

On the other hand, in the P channel transistor QP3, the first source voltage V1 is input into the source and substrate, a clock signal CL4 is supplied to the gate via an inverter INV3 and the drain is connected to the drain of the N-channel transistor QN2. The source and the substrate of the N-channel transistor QN2 are connected to the reference potential VSS and a clock signal CL5 is supplied to the gate.

In addition, on a line of the reference potential VSS, N channel transistors QN3, QN4 and QN5 are connected in series.

The capacitor C1 is connected to the common drain of transistors QP3 and QN2 and the source of transistor QN3. The capacitor C2 is connected to the common drain of transistors QP2 and QN1 and the source of transistor QN4. The stabilizing capacitor C0 is connected to the source of the channel transistor QN5 and the reference potential VSS. A boosted voltage VOUT is output from the stabilizing capacitor C0.

Figure 3:
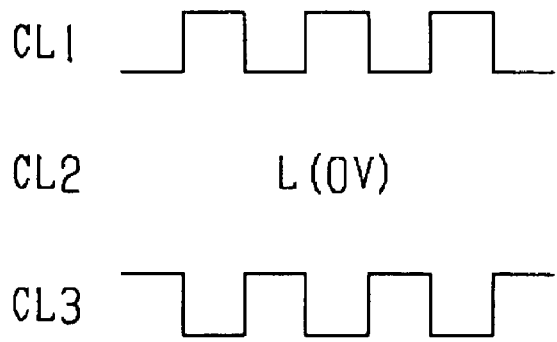
FIG. 3 is a timing chart that shows the operation of the circuit in FIG. 1.

Next, the circuitry operation of FIG. 1 is explained referring to FIG. 2 and FIG. 3. At first, the phase relationship of the clock signals CL1 to CL8 is described.

The clock signal CL1 of the transistor QP1 and the clock signal CL3 of the transistor QN1 are out of phase with each other. In addition, the clock signal CL1 of the transistor QP1 or the phase of the clock signal CL2 of the transistor QP2 and the clock signal CL3 of the transistor QN1 are out of phase with each other. The clock signal CL4 of the transistor QP3, the clock signal CL6 of the transistor QN3 and the clock signal CL8 of the transistor QN5 are in phase with the clock signal CL3 of the transistor QN1. The clock signal CL5 of the transistor QN2 and the clock signal CL7 of transistor QN4 are in phase with the clock signal CL1 of the transistor QP1 or the clock signal CL2 of the transistor QP2.

(1) At first, in the circuit shown in FIG. 1, when the first source voltage V1 is selected, the control means fixes the clock signal CL1 supplied to the gate of the transistor QP1 to be the source voltage VSS (=0V) which is at a low level (L level) so as to set the transistor QP1 to be in an "off" state.

At this time, the clock signals having a predetermined frequency as shown in FIG. 2 (50 kHz, for example) and out of phase with each other are provided as the clock signals CL2 and CL3 of the transistors QP2 and QN1 from the control means. The clock signals CL5 and CL7 of the transistors QN2 and QN4 are in phase with the clock signal CL2. The clock signals CL4, CL6 and CL8 of the transistors QP3, QN3 and QN5 are in phase with the clock signal CL3 as described before.

When the clock signal CL2 is at a L level and the clock CL3 is at a H level, the transistors QN1, QP3, QN3, QN3 and QN5 are turned "on" and the transistors QP2, QN2 and QN4 are turned "off". At this time, the capacitor C1 is charged with the source voltage V1 and the positive side of the capacitor C2 is connected to the reference potential VSS (=0V). As the result of it, the potential at the negative side of C2, namely the potential at the source side of the transistor QN4 turns negative with respect to the reference potential VSS and is supplied to the stabilizing capacitor C0 via the source and drain of the transistor QN5.

On the contrary, when the clock signal CL2 is at a H level, and the clock signal CL3 is at a L level, the transistors QN1, QP3, QN3 and QN5 are turned "off" and the transistors QP2, QN2, and QN3 are turned "on". At this time, the capacitor C2 is charged with the source voltage V1 and the positive side of the capacitor C1 is connected to the reference potential VSS (=0V). As the result of it, the potential at the negative side of C1, namely the potential at the source side of the transistor QN4 turns negative with respect to the reference potential VSS. Then, the transistor QP2 is turned "off" and the transistor QN1 is turned "on" (but the transistor QP3 is turned "on" then) by inverting the phase of the clock signals CL2 and CL3 during the next half period so as to turn the potential of the source side of the transistor QN4 to be negative with respect to the reference potential VSS.

As a result that the above mentioned charge pump operation with clock signals is implemented by a predetermined fast switching frequency (50 kHz, for example), the voltage VOUT which is charged and outputted by the stabilizing capacitor C0 is −2V1 (that is to say, −5.2V).

(2) Next, in the circuit shown in FIG. 1, when the second source voltage VC is selected, the control means, sets the clock signal CL2 supplied to the gate of the transistor QP2 to be the source voltage VSS (=0V) corresponding to a L level so as to set the transistor QP2 to be at an "off" state.

At this time, the clock signals having a predetermined frequency as shown in FIG. 3 (50 kHz, for example) and out of phase with each other are provided as the clock signals CL1 and CL3 of the transistors QP1 and QN1 from the control means. The clock signals CL5 and CL7 of the transistors QN2 and QN4 are in-phase with the clock signal CL1. The clock signals CL4, CL6 and CL8 of the transistors QP3, QN3 and QN5 are in-phase with the clock signal CL3 as described before.

When the clock signal CL1 is at a L level and the clock CL3 is at a H level, the transistors N1, QP3, QN3 and QN5 are turned "on," and the transistors QP1, QN2 and QN4 are turned "off". At this time, the capacitor C1 is charged with the source voltage V1 and the positive side of the capacitor C2 is connected to the reference potential VSS (=0V). As the result of it, the potential at the negative side of C2, namely the potential at the source side of the transistor QN4 turns negative with respect to the reference potential VSS, and is supplied to the stabilizing capacitor C0 via the source and drain of the transistor QN5.

On the contrary, when the clock signal CL1 is at a H level and the clock signal CL3 is at a L level, the transistors QN1, QP3, QN3 and QN5 are turned "off" and the transistors QP1, QN2, and QN4, are turned "on". At this time, the capacitor C2 is charged with the source voltage V1 and the positive side of the capacitor C1 is connected to the reference potential VSS (=0V). As the result of it, the potential at the negative side of C1, namely the potential at the source side of the transistor QN4 turns negative with respect to the reference potential VSS. Then, the transistor QP1 is turned "off" and the transistor QN1 is turned "on" (but the transistor QP3 is turned "on" then) by inverting the phase of the clock signals CL1 and CL3 during the next half period so as to turn the potential of the source side of the transistor QN4 negative with respect to the reference potential VSS.

As a result that the above mentioned charge pump operation with clock signals is implemented by a predetermined fast switching frequency (50 kHz, for example), the voltage VOUT charged and outputted by the stabilizing capacitor C0 is −VL−VC (namely, −3.9V).

Figure 4:
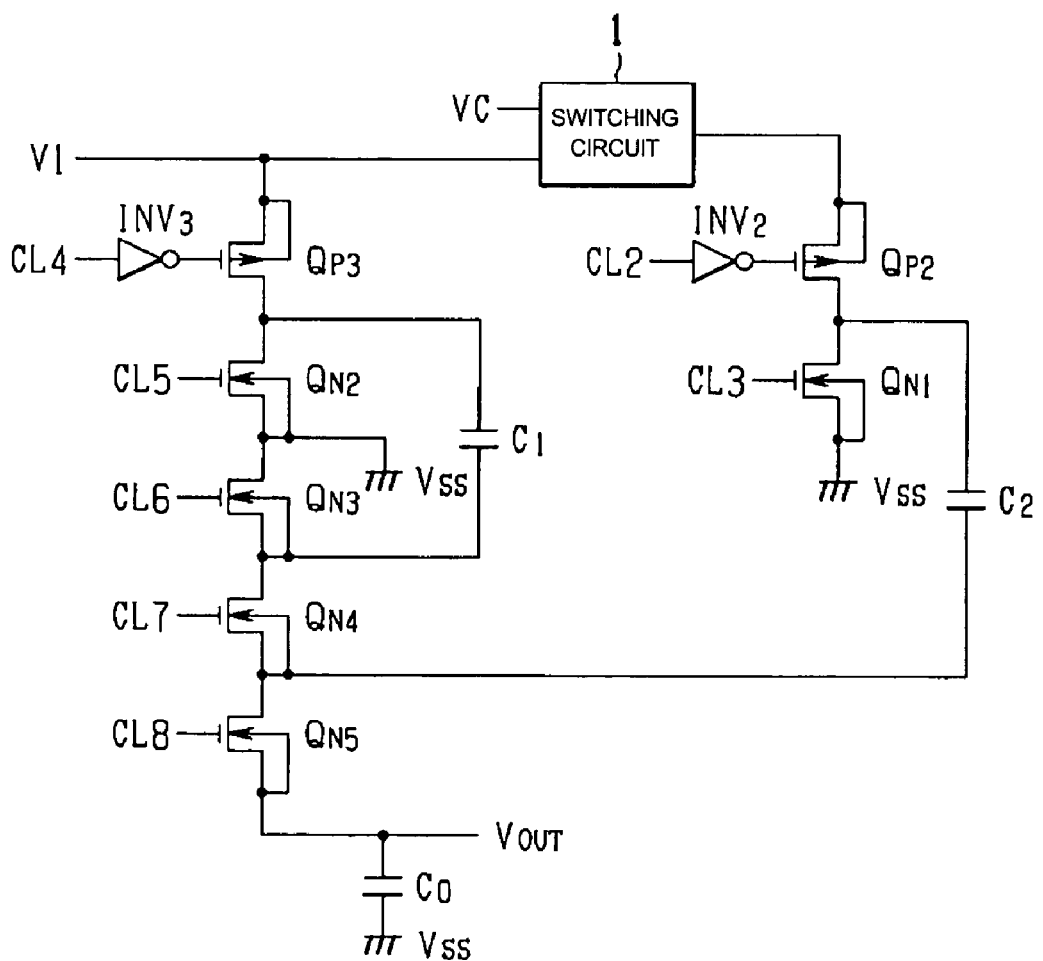
FIG. 4 illustrates a general constitution where one of a first and second power source voltages can be selectively input via a switching circuit comparing with the circuit in FIG. 1.

Here, in order to compare the circuit in FIG. 1, the structure shown in FIG. 4 is described instead of the structure in FIG. 1. Namely, the transistor QP1 is removed and the first and second source voltages V1 and VC are selectively enabled to be inputted via a switch circuit 1 including two input selectors in this structure.

In this FIG. 4, the inverter IN1 and the P channel transistor QP1 shown in FIG. 1 are omitted. Instead, the switching circuit 1 is installed and includes a two input selector that receives the first and second source voltages V1 and VC and selects one of the first or second source voltages V1 and VC.

Figure 5:
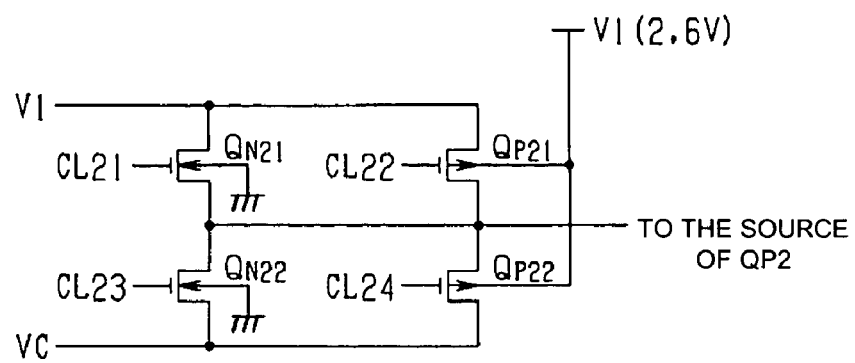
FIG. 5 is a circuit that shows a constitution of a switching circuit in FIG. 4.

The switching circuit 1 shown in FIG. 5. N-channel transistors QN21 and QN22 are serially connected between two input lines that receive the source voltages V1 and VC. P channel transistors QP21 and QP22 are connected in parallel with N-channel transistors QN21 and QN22, respectively. The selected source voltage V1 or source voltage VC is output to the source of the transistor QP2 (see FIG. 4) from a connecting point of the transistor QN22 with the transistor QN21. Switching signals CL21 and CL23 having an opposite level with respect to each other (antiphase) are supplied to the gates of N-channel transistors QN21 and QN22. Further, switching signals CL22 and CL24 having an opposite level with respect to each other (antiphase) are supplied to the gates of P-channel transistors QP21 and QP22. Switching signals CL21 and CL22 are out of phase with each other in order to turn N-channel transistors QN21 and P channel transistor QP21 "on" simultaneously. Similarly, switching signals CL23 and CL24 are out of phase with each other in order to turn N-channel transistors QN22 and P channel transistor QP22 "on" simultaneously. Here, in this structure, the N channel transistor QN21 and P channel transistor QP21 are connected as a pair and the N-channel transistor QN22 and P channel transistor QP22 are connected as a pair. This is the reason why characteristic dispersion of each of the P and N channel transistors is extinguished by combining a P channel transistor with a N channel transistor.

However, if the structure shown in FIG. 4 is adopted, there is a problem where the selected source voltage V1 or the source voltage VC must pass along switching transistors of the switching circuit 1 so as to increase the output of the impedance. This output impedance causes a problem where it affects the latter boosting circuit after passing the switching circuit with square of boosting multiple (such affect comes out). In other words, if the switching circuit shown in FIG. 4 is not adopted the structure of the first embodiment shown in FIG. 1 is adopted instead, it is possible to realize a power source circuit for switching input voltages with few effects of the output impedance.

Namely, according to the first embodiment described above, the voltage charged in the capacitor C2 can be selected without inputting transistor switch so as to lower the output impedance of the output voltage VOUT.

Figure 6:
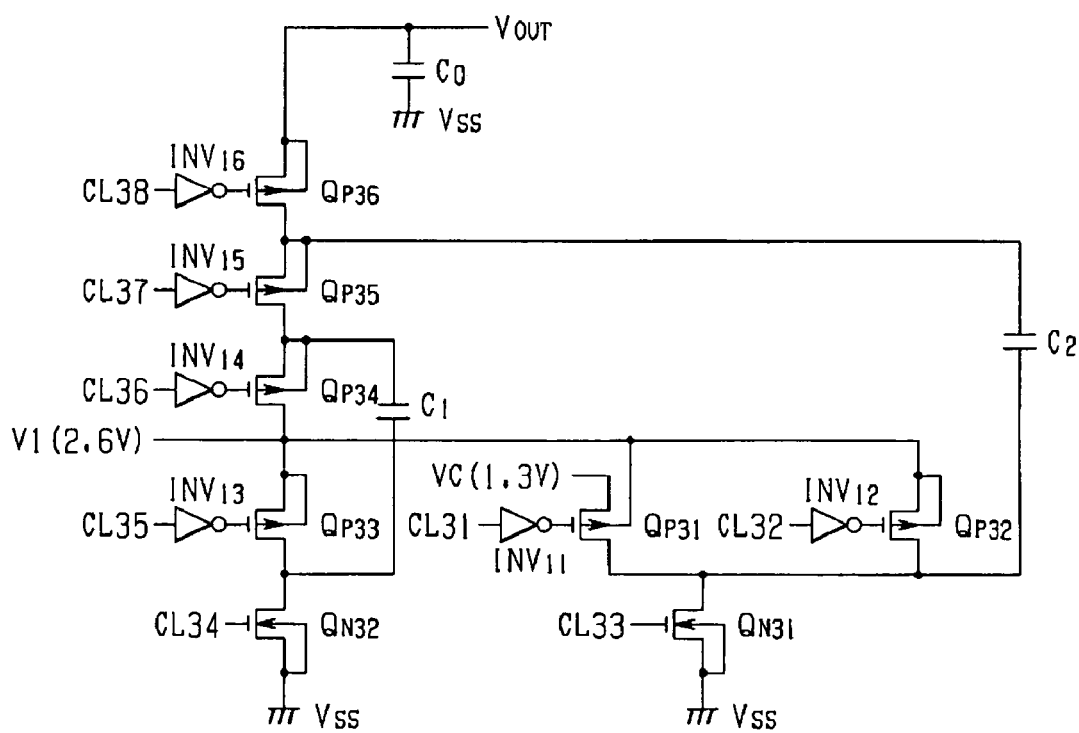
FIG. 6 is a circuit that shows a power source circuit of a second embodiment of the present invention.

FIG. 6 is a circuit diagram that shows a power source circuit of a second embodiment of the present invention.

This second embodiment shows a triple booster circuit with a positive direction. In other words, a portion of the transistor circuits including the capacitor C1 on the left side of the drawing implements a double-boosting operation in a positive direction. Then, another portion of the transistor circuits (including a portion for switching input voltages) including the capacitor C2 on the right side of the drawing implements one additional boosting operation in a positive direction. As the result of it, a triple boosting operation can be attained in a positive direction.

The booster circuit shown in FIG. 6 is installed between the source voltage V1 at the high potential side and the potential VSS at the low potential side. It includes a charge pump type booster including a plurality (eight in the diagram) of switching transistors QP31 to QP36, QN31 and QN32 and a plurality (three in the diagram) of capacitors C1, C2 and C0. The predetermined number (two in the drawing) of source voltages V1 and VC including the source voltage V1 at the high potential side (two in the drawing) are prepared as input voltages to a part of the booster circuit. One of the predetermined number of the source voltage V1 or VC is input selectively. Hence, it is possible to selectively output one of the predetermined number (two in the drawing) of the output voltages 3V1 and 2V1+VC as the output voltage VOUT based on the source voltage V1 on the high potential side and the above mentioned selectively input source voltage V1 or VC.

Then, of the plurality of transistors QP31 and QP32 capable of inputting the predetermined number of the source voltages V1 and VC among the plurality of switching transistors QP31 to QP36, QN31 and QN32 in the booster circuit, a control means fixes other transistors (for example, QP31) except one transistor (for example, QP32, QP31 or QP32 for example) to be in an "off" state. Further, the control means controls the booster circuit to implement a boosting operation by switching all transistors except the fixed transistors to be in an "off" state (transistors QP32 to QP36, QN31 and QN32 except QP31 for example) with a predetermined frequency and a predetermined phase relationship. Thus, it is possible to selectively output one of predetermined number of the output voltages 3V1 and 2V1+VC from the booster circuit by switching the input of the predetermined number of the power source voltages V1 and VC, which are prepared for input to a part of the boosting circuit.

Namely, the first source voltage V1 at the high potential side (2.6V, for example) or the second source voltage VC (1.3V, for example) is switched and inputted as an input voltage. Then, it is possible to generate and output the first output voltage VOUT (−7.8V, for example) boosted based on the first power source voltage V1 as an output voltage. Also, it is possible to generate and output the second output voltage VOUT (6.5V, for example) boosted based on the first power source voltage V1 and the second power source voltage VC.

Here, in the second embodiment, two input voltages V1 and VC are prepared and switched. But, it is possible to prepare and switch three or more input voltages. In case of preparing and switching three or more input voltages, a plurality of switching transistors inputting these three or more input voltages are prepared. It is necessary to control fixing other transistors except one the transistor for the inputting and switching operation to be "off" implementing the boosting operation by switching all switching transistors except the fixed transistors to be "off" in the booster circuit with a predetermined frequency and a predetermined phase relationship.

The structure shown in FIG. 6 is described in detail.

In the booster circuit in FIG. 6, a P channel transistor QP32 and a N-channel transistor QN31 are connected in series between the first power source voltage V1 at the high potential side and the potential VSS at the low potential side. In parallel with these, a P channel transistor QP33 and a N-channel transistor QN32 are connected in series. The P channel transistor QP31 is connected to the P channel transistor QP32 in parallel.

The source of the P channel transistor QP32 receives the first source voltage V1 (2.6V, for example) and the gate of it receives the clock signal CL32 from the control means via an inverter INV12.

The source of the P channel transistor QP31 receives the second source voltage VC (1.3V, for example) and the gate of it receives the clock signal CL31 from the control means via an inverter INV11.

On the other hand, the clock signal CL35 is supplied to the gate of the P channel transistor QP33 via an inverter (inverter circuit) INV13 and the first source voltage V1 (2.6V, for example) is input into the source of it. The clock signal CL34 is supplied to the gate of the N-channel transistor QN32.

In addition, P channel transistors QP34, QP35, and QP36 are serially connected on the line of the first source voltage V1 (2.6V, for example). Clock signals CL36, CL37 and CL38 are supplied to the gates of transistors QP34, QP35 and QP36 via Inverters INV14, INV15 and INV16 from the control means.

The capacitor C1 is connected to the common drain of the transistor QP33 and the transistor QN32 and the source of transistor QN34. The capacitor C2 is connected to the common drain of the transistor QP32 and the transistor QN31 and the source of transistor QN35. The stabilizing capacitor C0 is connected to the source of the channel transistor QN36 and the reference potential VSS. Then, the boosted voltage VOUT is output from the stabilizing capacitor C0.

Here, the phase relationship of the clock signals CL to CL8 is described.

The clock signal CL31 of the transistor QP31 and the clock signal CL33 of the transistor QN31 are out of phase with each other. In addition, the clock signal CL32 of the transistor QP32 the clock signal CL33 of the transistor QN31 are out of phase with each other.

The clock signal CL34 of the transistor QP32, the clock signal CL36 of the transistor QP34 and the clock signal CL48 of the transistor QP36 are in phase with the clock signal CL31 of the transistor QP31 or the clock signal CL32 of the transistor QP32 described above. The clock signal CL35 of the transistor QP33 and the clock signal CL37 of the transistor QP35 are in phase with the clock signal CL33 of the transistor QN31.

In addition, in this second embodiment, the inverter is installed at the stage before the gate of the P channel transistor, in order to supply the clock signal to the gate of the P channel transistor. On the other hand, this inverter may be removed and a polarity of the clock signal supplied to the gate of the P channel transistor may be inverted (namely, the phase of the clock signal is inverted) instead. This approach is similarly applied to the first embodiment shown in FIG. 1 and FIG. 4 and other embodiments described after the second embodiment.

The operation is briefly explained as follows.

(1) At first, when the first source voltage V1 is selected, the control means fixes the clock signal CL31, supplied to the gate of the QP31, to be the source voltage VSS (=0V) so as to fix the transistor QP31 to be in an "off" state corresponding to a L level.

At this time, the clock signals CL32 and CL33 with a predetermined frequency (50 kHz, for example) and out of phase with each other are supplied to the transistors QP32 and QN31 from the control means. The clock signals CL34, CL36, and CL38 of the transistors QN32, QP34 and QP36 are in phase with the clock signal CL32. The clock signals CL35 and CL37 of the transistors QP33 and QP35 are in phase with the clock signal CL33 as described before.

When the clock signal CL32 is at a H level and the clock signal CL33 is at a L level, the transistors QP32, QNP32, QP34 and QP36 are turned "on" and the transistors QN31, QP33 and QP35 are turned "off". At this time, the capacitor C1 is charged with source voltage V1 and the negative side of the capacitor C2 is connected to the source voltage V1 ($=2.6V$). As the result of it, the potential at the positive side of the capacitor C2, namely the potential at the source side of the transistor QP35 turns positive with respect to the source voltage V1 and supplied to the stabilizing capacitor C0 via the drain and source of the transistor QP36.

On the contrary, when the clock signal CL32 is at a L level and the clock CL33 is at a H level, the transistors QP32, QNP32, QP34 and QP36 are turned "off" and the transistors QN31, QP33 and QP35 are turned "on". At this time, the positives side of the capacitor C2 is connected to the reference potential VSS and the positive side of the capacitor C1 is connected to the source voltage V1 ($=2.6V$). As a result of it, the negative side of the capacitor C1, namely the source side potential of the transistor QP34 turns positive. Then, the transistor QP32 is turned "on", the transistor QN31 turned "off" (the transistor QP33 is turned "off" then) by inverting the phase of the clock signal CL32 and CL33 during the next half-period, and the source side potential of the transistor QP35 turns positive.

As a result that the above charge pumping operation is completed with high speed switching frequency (50 kHz, for example), the output voltage VOUT which is charged and outputted by the stabilizing capacitor C0, becomes 3V1 (namely, 7.8V).

(2) Next, when the second source voltage VC is selected, the control means fixes the clock signal CL32, supplied to the gate of the QP32, to be the source voltage VSS ($=0V$) so as to fix the transistor QP32 to be at an "off" state corresponding to a L level.

A this time, the clock signals CL31 and CL33 with a predetermined frequency (50 kHz, for example) and out of phase with each other are supplied to the transistors QP31 and QN31 from the control means. The clock signals CL34, CL36, and CL38 of the transistors QN32, QP34 and QP36 are in phase with the clock signal CL31. The clock signals CL35 and CL37 of the transistors QP33 and QP35 are in phase with the clock signal CL33 as described before.

When the clock signal CL31 is at a H level and the clock signal CL33 is at a L level, the transistors QP31, QNP32, QP34 and QP36 are turned "on" and the transistors QN31, QP33, and QP35 are turned "off". At this time, the capacitor C1 is charged with the source voltage V1 ($=2.6V$) and the positive side of the capacitor C2 is connected to the source voltage VC ($=1.3V$). As the result of it, the potential at the negative side of the capacitor C2, namely the potential at the source side of the transistor QP35 turns positive with respect to the source voltage VC and supplied to the stabilizing capacitor C0 via the drain and source of the transistor QP36.

On the contrary, when the clock signal CL31 is at a L level and the clock CL33 is at a H level, the transistors QP31, QNP32, QP34 and QP36 are turned "off" and the transistors QN31, QP33, QP35 are turned "on". At this time, the positive side of the capacitor C2 is connected to the reference potential VSS and the negative side of the capacitor C1 is connected to the source voltage V1 ($=2.6V$). As a result of it, the positive side of the capacitor C1, namely the source side potential of the transistor QP34 turns positive. Then, the transistor QP31 is turned "on", the transistor QN31 turned "off" (the transistor QP33 is turned "off" then) by inverting the phase of the clock signal CL31 and CL33 during the next half-period, and the source side potential of the transistor QP35 turns positive.

As a result that the above charge pumping operation is completed with a high speed switching frequency (50 kHz, for example) the output voltage VOUT, which is charged and outputted by the stabilizing capacitor C0, is turned to be 2V1+VC (namely, 6.5V).

In the above-mentioned second embodiment, it is possible to select the voltage charged to the capacitor C2 without putting transistor switches on the way so as to enable the output impedance of the output voltage VOUT to be lowered.

Figure 7:
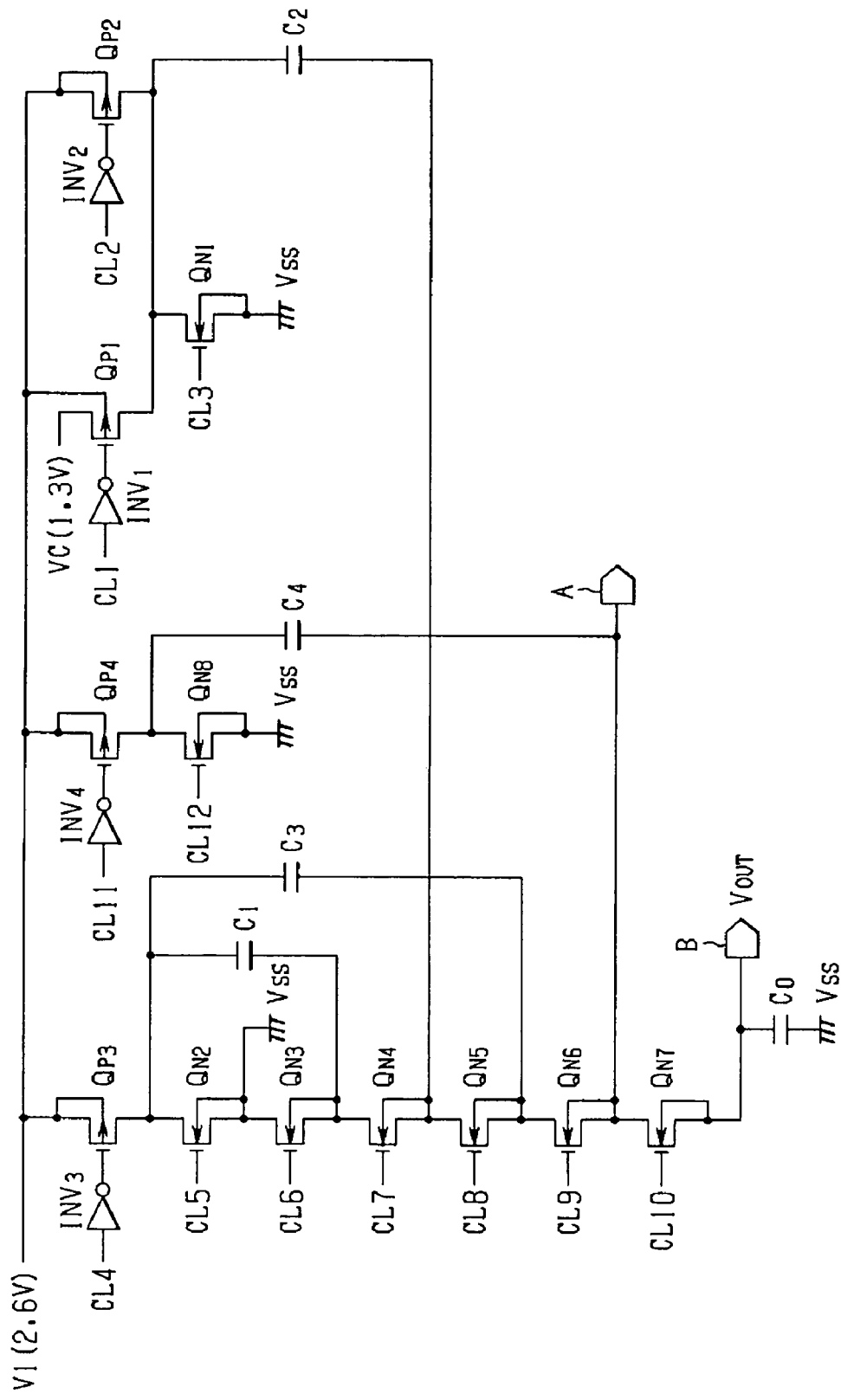
FIG. 7 is a circuit that shows a power source circuit of a third embodiment of the present invention.

FIG. 7 is a circuit diagram that shows a power source circuit of a third embodiment of the present invention.

In this power source circuit of the third embodiment, a multiple stage boosting circuit having a plurality of boosting stages is provided. The output terminal of the multiple stage boosting circuit is short-circuited with the output terminal of the capacitor constituting at least the final stage of the multiple stage boosting circuit and the capacitor is removed so as to enable the number of boosting stages to be reduced.

The third embodiment shows a four stage booster circuit with a negative direction.

In the booster circuit shown in FIG. 7, the N-channel transistors QN6 and QN7 are connected in series between the source of the N-channel transistor QN5 and the output terminal of the stabilizing capacitor C0 in the two stage booster circuit with negative direction shown in FIG. 1. The capacitor C3 is connected to the common connecting point (drain) of the P channel transistor QP3 with N-channel transistor QN2 and connecting point of the N-channel transistor QN5 and QN6. The P channel transistor QP4 and the N-channel transistor QN8 are serially connected between the first source voltage V1 at the high potential side and reference potential VSS. The capacitor C4 is connected to the connecting point (drain) of the transistor QP4 with QN8 and the connecting point of the transistor QN6 with QN7. Then, the terminal A is established at the connecting point of the end of the capacitor C4 with the source of the transistor QN6 and the terminal B is established at the output terminal of the stabilizing capacitor C0. In addition, the clock signal CL11 is input into the gate of the P channel transistor QP4 via the inverter INV4 and the clock signal CL12 is input into the gate of the N channel transistor QN8.

Here, the phase relationship of the clock signals is explained.

The clock signal CL1 of the transistor QP1 and the clock signal CL3 of transistor QN1 are out of phase with each other. The clock signal CL11 of transistor QP4 and the clock signal CL12 of the transistor QN8 are out of phase with each other. The clock signal CL1 or the clock signal CL2 is in-phase with the clock signal CL11. In addition, the clock signal CL1 of the transistor QP1 or the clock signal CL2 of the transistor QP2 and the clock signal CL3 of the transistor QN1 are out of phase with each other. The clock signal CL3 is in-phase with the clock signal CL12. The clock signal CL4 of the transistor QP3, the clock signal CL6 of the transistor QN3, the clock signal CL8 of the transistor QN5 and the clock signal CL10 of the transistor QN7 are in-phase with the clock signal CL3 of the transistor QN1 and the clock signal CL12 of the transistor QN8. The clock signal CL5 of the transistor QN2, the clock signal CL7 of the transistor QN4 and the clock signal CL9 of the transistor QN6 are in-phase with the clock signal CL1 of the transistor QP1 or the clock signal CL2 of the transistor QP2.

Other structures are the same as shown in FIG. 1 and the explanation is omitted.

Next, the operation of FIG. 7 is briefly explained.

At first, when the first source voltage V1 is selected, the control means fixes the clock signal CL1, supplied to the gate of the QP1, to be the source voltage VSS (=0V) corresponding to the low level(L level) so as to fix the transistor QP31 to be in an "off" state. Then, the above mentioned clock signals CL1 to CL12 are supplied so as to complete the charge pumping operation with the fast predetermined switching frequency. As the result of it, the output voltage VOUT output from the stabilizing capacitor C0 becomes 4V1 (namely, −10.4V).

At first, when the second source voltage VC is selected, the control means fixes the clock signal CL2, supplied to the gate of the transistor QP2, to be the source voltage VSS (=0V) corresponding to a L level so as to fix the transistor QP2 to be in a "off" state. Then, the above mentioned clock signals CL1 to CL12 are supplied so as to complete the charge pumping operation with the fast predetermined switching frequency. As the result of it, the output voltage VOUT output from the stabilizing capacitor C0 becomes −3V1−V (namely, −9.1V).

Therefore, the booster circuit of FIG. 7 selects either the first source voltage V1 or the second source voltage VC operates as a normal booster circuit so that the output voltage VOUT becomes −10.4V or −9.1V.

By the way, in the above booster circuit of FIG. 7, the transistors QP1 to QP4, the transistors QN1 to QN8 and the inverters INV1 to INV4 are arranged in a integrated circuit (IC) and the terminals A and B and the capacitor C1 to C4, C0 are junction terminals installed inside the IC for outside connections.

Figure 8:
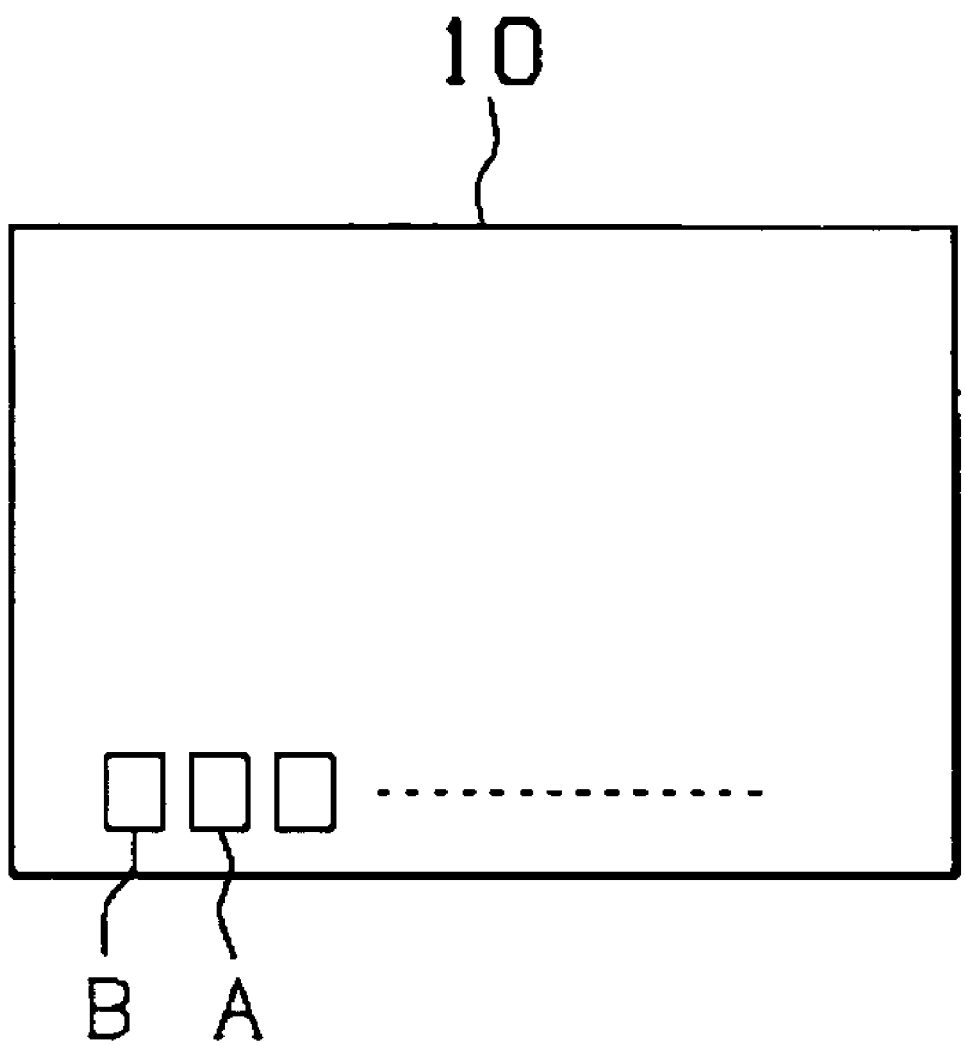
FIG. 8 is a diagram that shows a terminal B for outputting an output voltage VOUT and a terminal A connected to the end of a capacitor which are arranged at the outside of the IC provided with the booster circuit in FIG. 7.

Thus, as shown in FIG. 8, the terminal B for outputting the above mentioned output voltage VOUT and the terminal A connected to the one end of capacitor C4 (namely, the source of QN6) are arranged inside of the IC10 provided with the booster circuit. In addition, it is preferable that the terminal B and terminal A are arranged so as to have the shortest distance on the substrate for avoiding wiring resistance. Then, the terminal A is electrically connected to the terminal B with a lead at the outside of the IC. Then, the capacitor C4 is removed and a voltage of a H level is supplied to the gate of the transistor QN7 so as to fix the transistor QN7 to be in an "on" state. But it is not necessarily required to fix transistor QN7 to be in an "on" state. By this, the number of stages of the four stages of the booster circuit in FIG. 7 reduces to three. One of the first source voltage V1 and the second source voltage VC is selected to operate the booster circuit such that output voltage VOUT becomes −7.8V or −6.5V.

Figure 9:
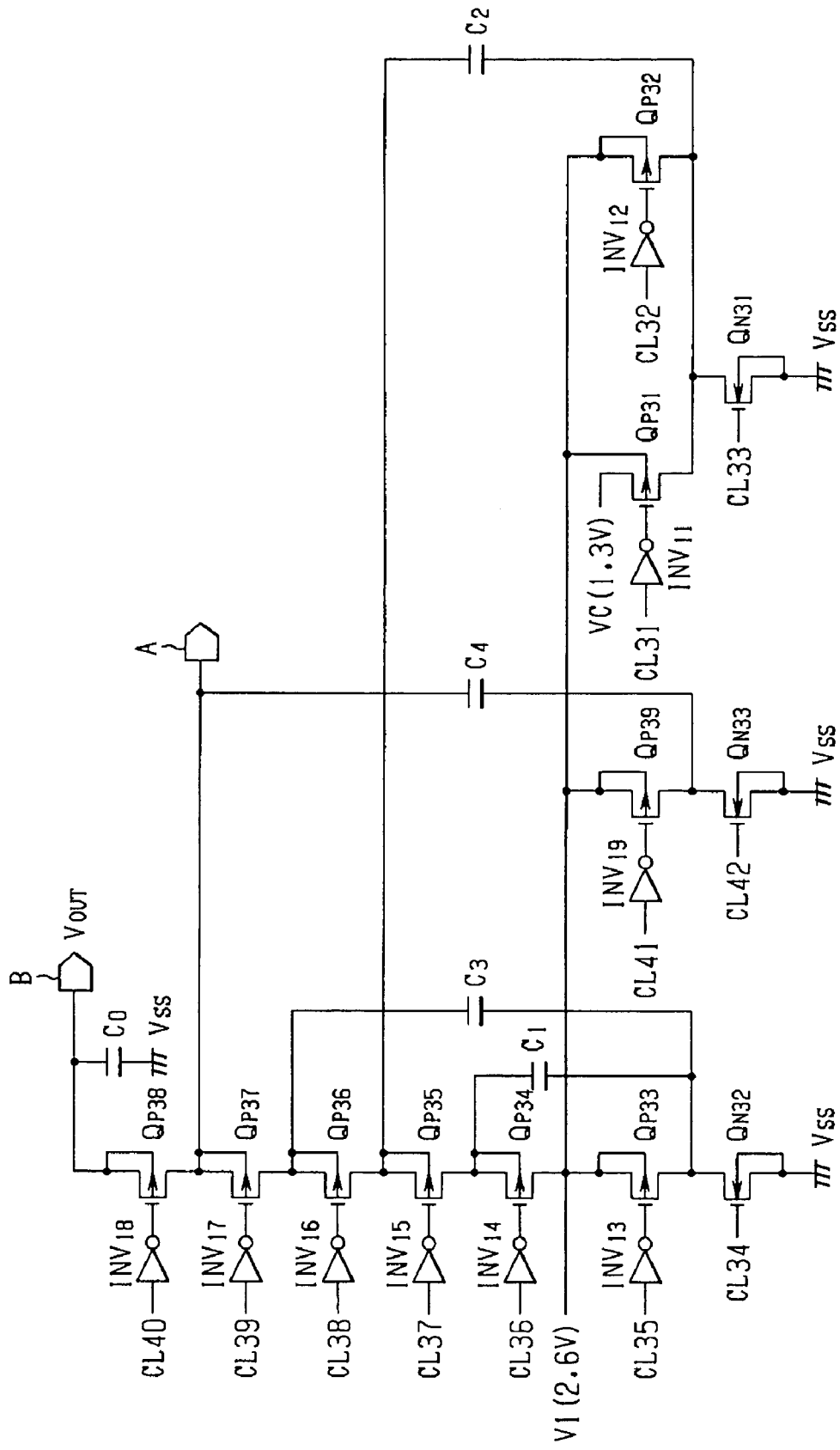
FIG. 9 is a block diagram that shows a power source circuit of the fourth embodiment of the present invention.

FIG. 9 is a block diagram that shows a power source circuit of a fourth embodiment of the present invention.

This fourth embodiment shows a quintuple booster circuit with the positive direction.

In the booster circuit shown in FIG. 7, the N-channel transistors QP37 and QP38 are connected in series between the source of the P-channel transistor QP36 and the stabilizing capacitor C0 in the triple booster circuit with the positive direction shown in FIG. 1. The capacitor C3 is connected to the source of the P channel transistor QP36 and the drain of the P channel transistor QP33. The P channel transistor QP39 and the N-channel transistor QN33 are serially connected between the first source voltage V1 at the high potential side and reference potential VSS. The capacitor C4 is connected to the drain of the transistor QP439 and the source of the transistor QP37. The terminal A is established at the connecting point of one end of the capacitor C4 with the source of the transistor QP37 and the terminal B is established at the output terminal of the stabilizing capacitor C0. In addition, the clock signal CL41 is input into the gate of the P channel transistor QP39 via the inverter INV19 and the clock signal CL42 is input into the gate of the N-channel transistor QN33.

Here, the phase relationship of the clock signals is described.

The clock signal CL31 of the transistor QP31 and the clock signal CL33 of the transistor QN31 are out of phase with each other. In addition, the clock signal CL32 of the transistor QP2 and the clock signal CL33 of the transistor QN31 are out of phase with each other. The clock signal CL41 of the transistor QP39 and the clock signal CL42 of the transistor QN33 are out of phase with each other. The clock signal CL33 of the transistor QN31 is in-phase with the clock signal CL42 of the transistor QN33.

The clock signal CL34 of the transistor QP32, the clock signal CL36 of the transistor QP34, the clock signal CL38 of the transistor QP36 and the clock signal CL40 of the transistor QP38 are in-phase with the clock signal CL31 of the transistor QP31 and the clock signal CL32 of the transistor QP32. The clock signal CL35 of the transistor QP33, the clock signal CL37 of the transistor QP35 and the clock signal CL39 of the transistor QP37 are in-phase with the clock signal CL33 of the transistor QN31.

Other structures that are the same as shown in FIG. 6, the explanation has been omitted.

In this booster circuit of FIG. 9, one of the source voltage V1 and the second source voltage VC is selected to operate the normal booster circuit. Thus, the output voltage VOUT becomes 5V1 (=13.0V) or 4V1+VC (=11.7V).

On the other hand, in the structure of the above booster circuit of FIG. 9, the transistors QP31 to QP39, the transistors QN31 to QN33 and the inverter INV11 to INV19 are arranged in a integrated circuit (IC). The capacitors C1 to C4, C0 and the terminals A and B are junction terminals installed inside IC for outside connections.

Thus, the terminal B for outputting the above mentioned output voltage VOUT and the terminal A connected to the one end of capacitor C4 (namely, the source of QP37) are arranged inside of the IC provided with the booster circuit. Then, the terminal A is electrically connected to the terminal B with a lead at the outside of the IC. Then, the capacitor C4 is removed and a voltage of a H level is supplied to the gate of the transistor QP38 so as to fix the transistor QP38 to be in an "on" state. But it is not necessarily required to fix transistor QP38 to be in an "on" state. By this, the number of stages of the four stages of the quintuple booster circuit in FIG. 9 becomes three. One of the first source voltage V1 and the second source voltage VC is selected to operate the booster circuit such that output voltage VOUT is turned to be 4V1 (=10.4V) or 3V1+VC (=9.1V).

According to the above third and fourth embodiments, first, the multiple-stages booster circuit is provided with the maximum number of stages that may be necessary for a customer. Then, the numbers of stages of the booster circuit can be reduced by short circuiting from outside the IC or adjusting the number of outside capacitors in order to fix the actual condition.

In the circuitry of FIG. 7 and FIG. 9, in addition that one of the first and the second source voltage is selected as the input voltage, the number of boosting stages can be changed such that it is possible to generate the number of output voltages having 2× (number of boosting stages) ways as the output voltage VOUT. Furthermore, if the number of selected input voltages increase more than 3, further various kinds of voltages can be generated as the output voltage VOUT.

By the way, the general triple booster circuit in the negative direction is shown in FIG. 10(A). In this circuit, the drain and the source of the N-channel transistor QN6 is serially connected to the source of the N-channel transistor QN5 and the stabilizing capacitor C0 in FIG. 1 respectively. The capacitor C3 is connected to the drain of the N-channel transistor QN2 and the drain of the N-channel transistor QN6 in FIG. 1. Then, the P channel transistor QP1 and the inverter INV1 are eliminated to form the triple booster circuit in negative direction.

The input voltage is only the source voltage V1 (2.6V, for example) and the output voltage VOUT is −3V1 (=−7.8V). This output voltage VOUT is taken out as a stability potential through stabilizing capacitor C0. However, in the multiple stage booster circuit in FIG. 10(A), the potentials a, b, and c at the N-channel transistors QN3, QN4, and QN5, are not stable as shown in FIG. 10(B) due to the boosting operation with high speed switching. Due to this instability, potential (−5.2V and −2.6V for example) in at least one stage on the way of the multiple stage booster circuit was not able to be taken out as a stable potential.

Figure 11:
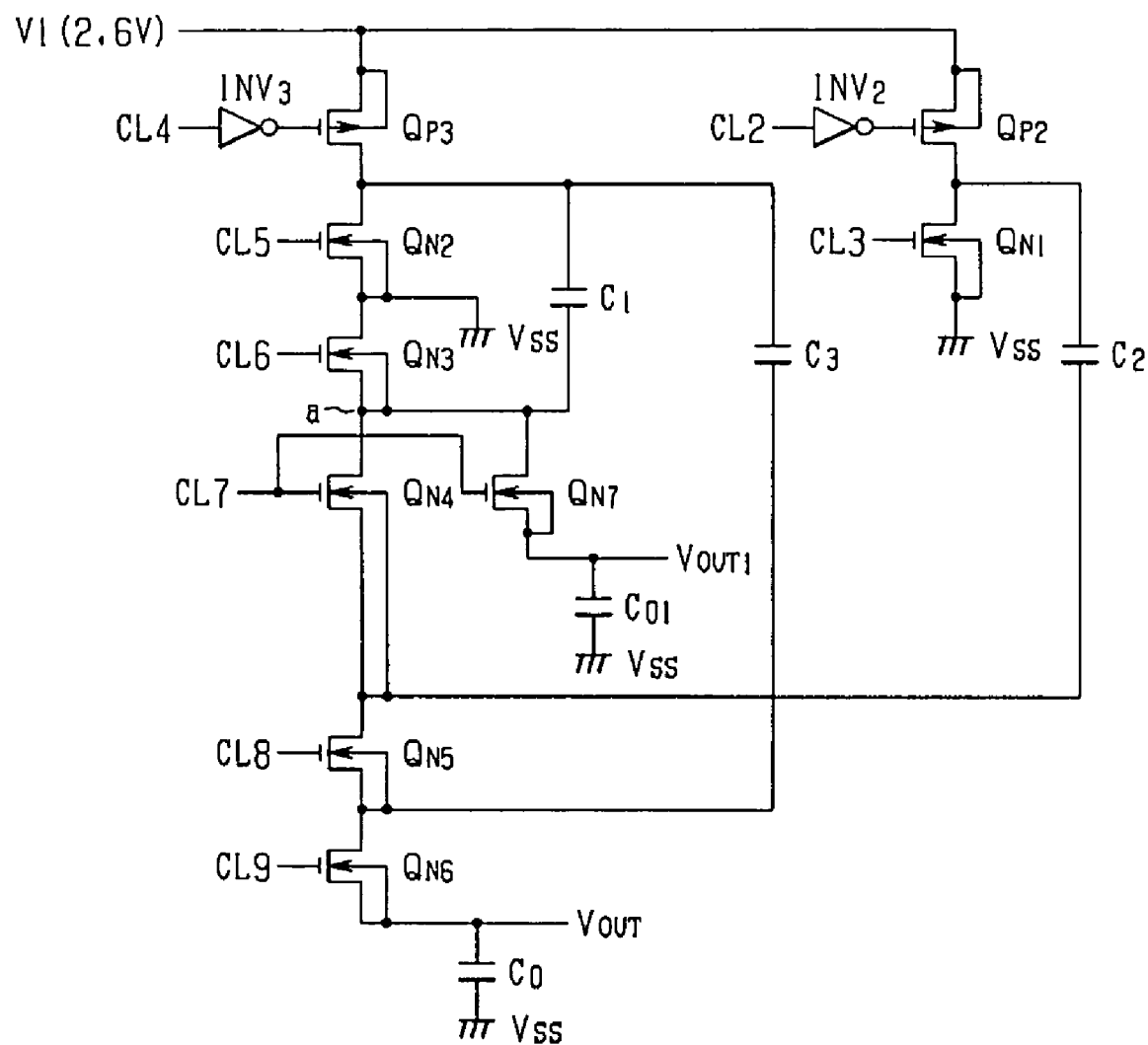
FIG. 11 is a block diagram that shows a power source circuit of the fifth embodiment of the present invention.

FIG. 11 is a block diagram that shows a power source circuit of a fifth embodiment of the present invention.

Figure 10:
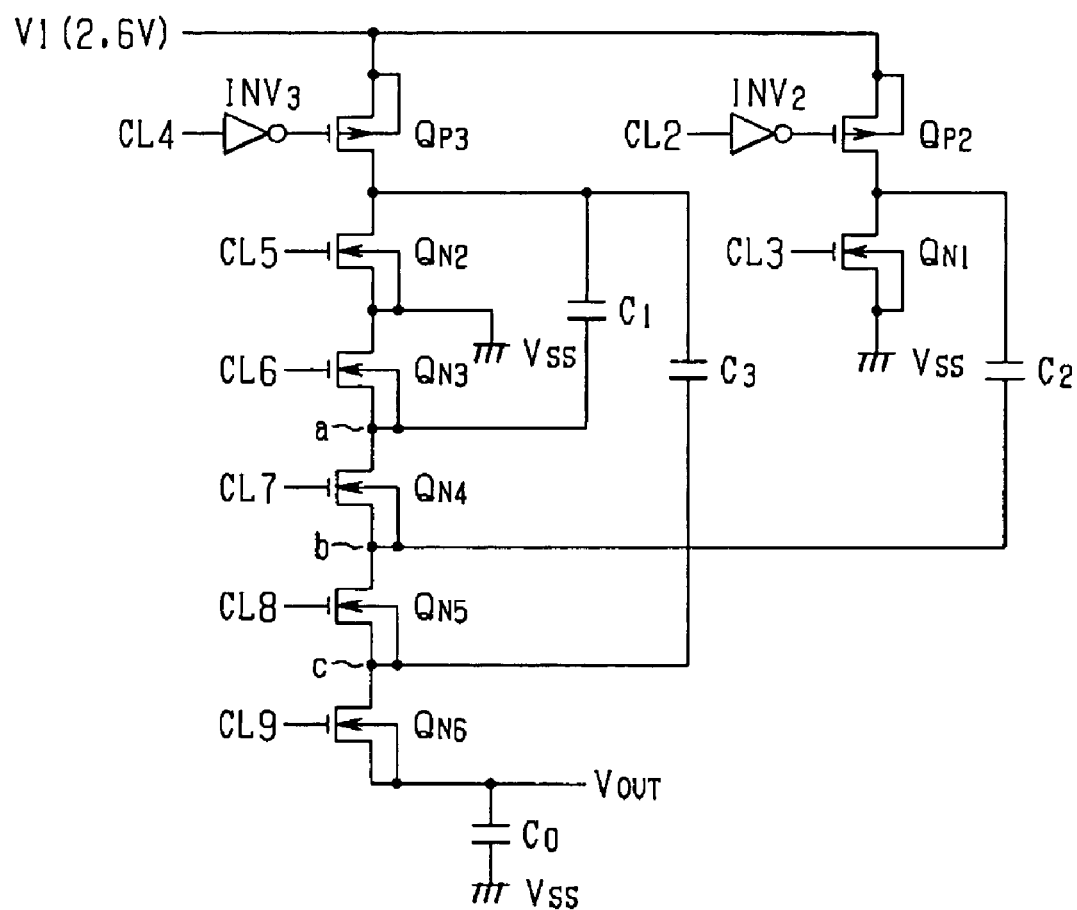
FIG. 10 shows a circuit diagram including a general triple booster circuit with a negative direction and a waveform diagram of its potential on the way.
Figure 10:

The same reference numerals refer to the same part shown in FIG. 10. The power source circuit shown in the fifth embodiment is provided with a multiple stage booster circuit including a plurality of multiple boosting stages. The negative side of the capacitor that is at least one stage on the way in the multiple stage booster circuit is connected to an output capacitor via a transistor so as to take the potential on the way out from the output capacitor.

In the booster circuit of FIG. 11, the N channel transistor QN7 is installed in parallel with the N-channel transistor QN4 shown in FIG. 10. The drain of the N channel transistor QN7 is connected to the source of the N channel transistor QN3 (the drain of QN4). The transistor QN7 is turned "on" and "off" at the same that the transistor QN4 is turned "on" and "off" (namely, with the same phase) so as to take −V1 (=−2.6V) with stability as the first stage of the output voltage VOUT1 from the source of the transistor QN7 via the stabilizing capacitor C01 for output. Of course, −3V1 (=−7.8V) can be taken out at the same time as the output voltage VOUT similar to the output voltage of FIG. 10(A) from the stabilizing capacitor C01.

In addition, a capacitor for output at the second stage is similarly connected to the output terminal of the capacitor 2 via a transistor so as to take −2×V1 (=−5.2V) out with stability as the output voltage VOUT2.

Figure 12:
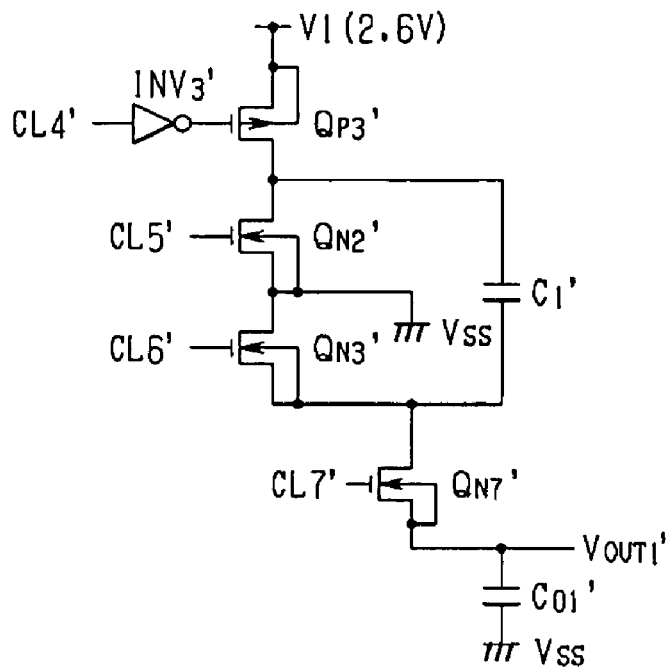
FIG. 12 is a block diagram that shows the specific booster circuit that is needed generally to generate a potential on the way.

In general, if −V1 (=−2.6V) is necessary, it is necessary to constitute the specific booster circuit as shown in FIG. 12 so as to obtain −V1 (=−2.6V). Transistors QP3', QN2', QN3' and QN7', an inverter INV3', a capacitor C1', a stabilizing capacitor C01', an output voltage VOUT1' and clock signals CL4', CL5', CL6', and CL7' in FIG. 12 correspond to the transistors QP3, QN2, QN3, QN7 and the inverter INV3, the capacitor C1, the stabilizing capacitor C01, the output voltage VOUT1 and clock signals CL4, CL5, CL6, and CL7 shown in FIG. 11 respectively. The clock signals CL4' and CL6 are in-phase each other and the clock signal CL5' and CL7' are in-phase each other. The clock signal CL4' and CL6 and clock signal CL5' and CL7' are out of phase with each other.

According to the above mentioned fifth embodiment, only the transistor QN7 and the stabilizing capacitor C01 are added and a part of the triple booster circuit can be utilized as other components such that the number of parts can be small compared with installing the specific booster circuit shown in FIG. 12.

Regarding methods for driving a liquid crystal display, there is a method called as a fundamental driving method. This method is used for a simple matrix type liquid crystal panel such as a color Super Twisted Nematic (STN).

Figure 13:
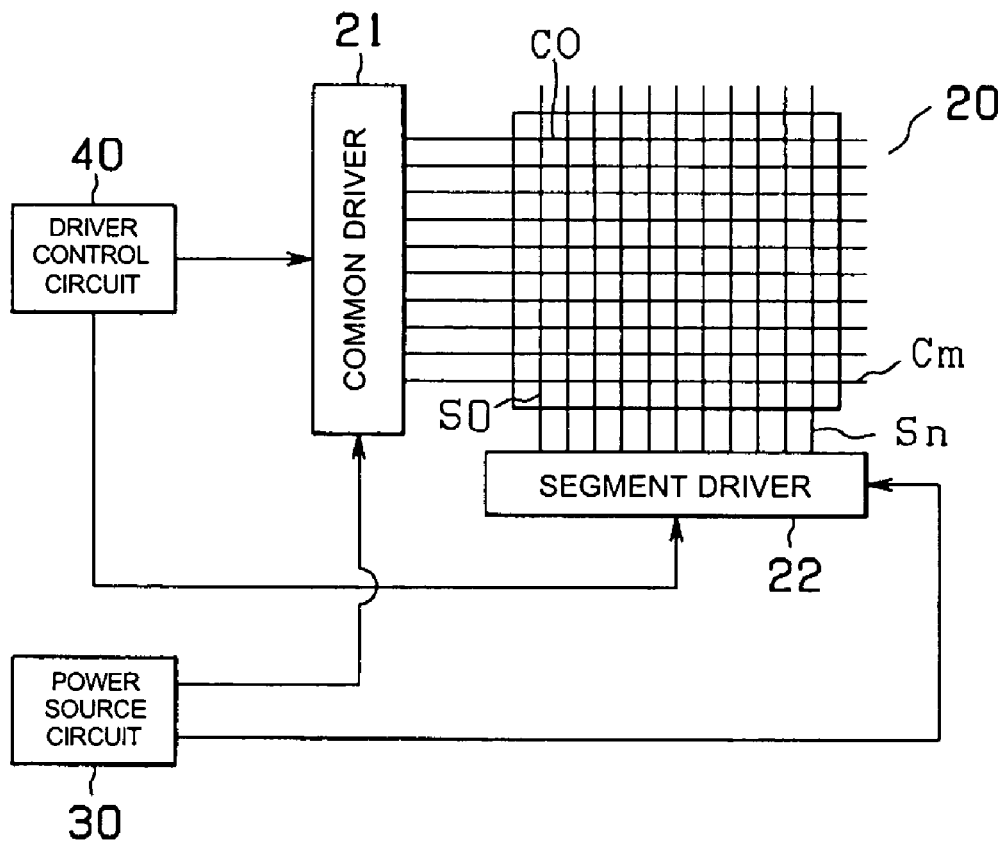
FIG. 13 is a structural diagram that shows a constitution of a liquid crystal display.

In a liquid crystal display, as shown in FIG. 13, a liquid crystal panel, a simple matrix type liquid crystal panel 20, for example, includes a first substrate including common electrodes C0 to Cm and a second substrate including segment electrodes S0 to Sn and a liquid crystal encapsulated between the two substrates. The intersection point of one common electrode with one segment electrode is a pixel for a display. There are (m+1)×(n+1) pixels in the liquid crystal panel 20. In addition, other types of liquid crystal panels such as an active-matrix type liquid-crystal display panel can be used as the liquid crystal panel instead of a simple type liquid crystal panel 20.

A common driver 21 connected to the common electrodes C0 to Cm and the segment driver 22 connected to the segment electrodes S0 to Sn are installed as a drive circuit for driving the liquid crystal panel 20. Predetermined voltages are supplied to the common driver 21 and the segment driver 22 from the power source circuit 30 while a common voltage and a segment voltage are supplied to the common electrodes C0 to Cm and segment electrodes S0 to Sn based on the signals from the control circuit 40.

Under the fundamental driving method, the three voltages V2, VC, and MV2 are utilized as the common voltage and two voltages, V1 and MV1 are utilized as the segment voltage. For example, V2=16.9V, VC=1.3V, MV2=−14.3V are used as the common voltage and V1=2.6V and MV1=0V are used as the segment voltage. The three common voltage values are combined with the two segment voltage values so as to realize a gray scale for pixels of a liquid crystal panel.

In a liquid crystal display using the fundamental driving method, it is necessary to form a non bias state where a voltage is not applied to a liquid crystal in order to make the display be "off" (the state of no image on a liquid crystal display). In order to attain this, for example, the segment voltage V1=2.6V is decreased to 1.3V and the non-bias state is realized by using the common voltage VC=1.3V and the decreased voltage (=1.3V) from the segment voltage V1.

Figure 14:
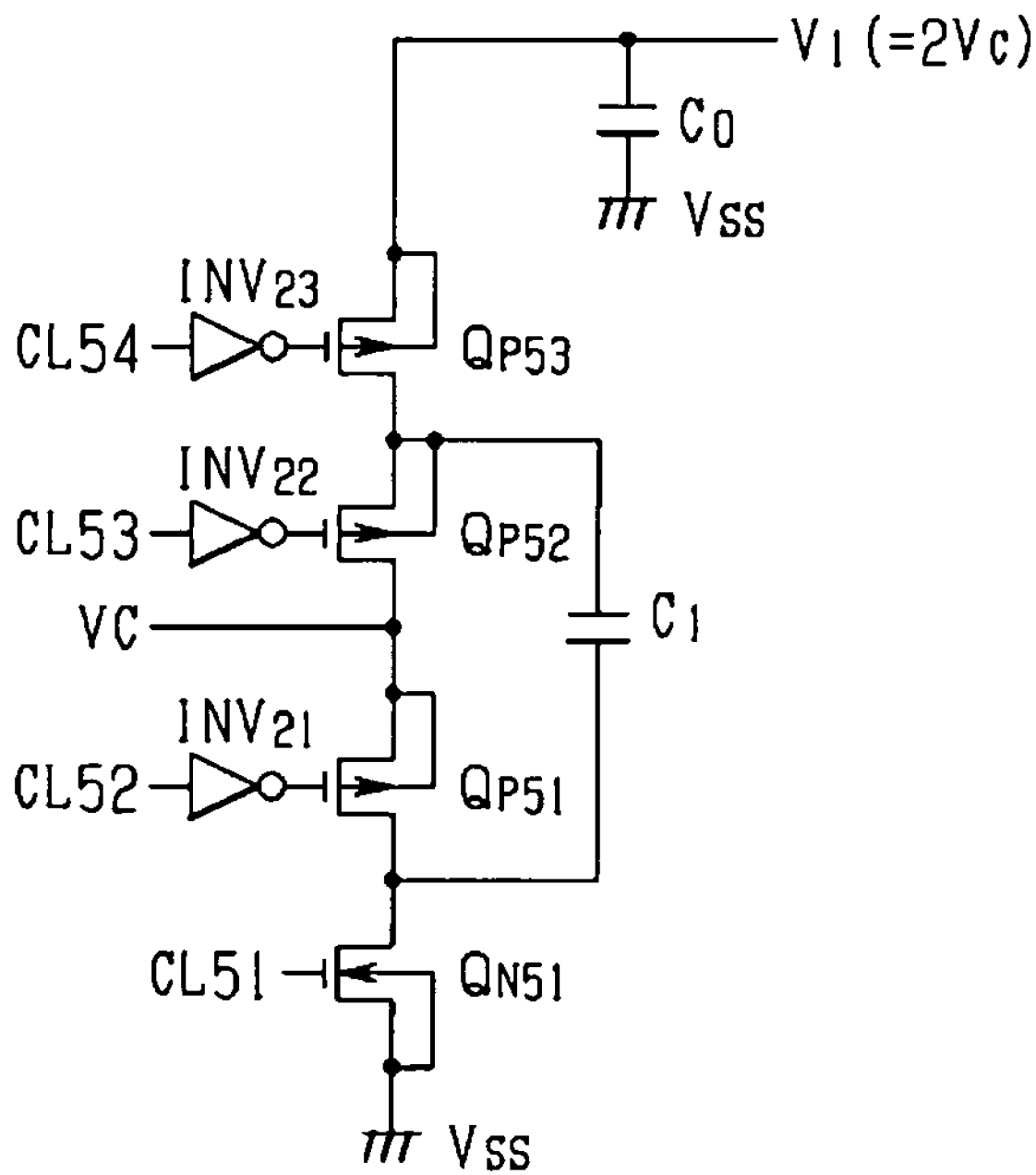
FIG. 14 is a diagram circuit shows that a circuit for generating a segment voltage V1 with using a double booster circuit with positive direction.
Figure 15:
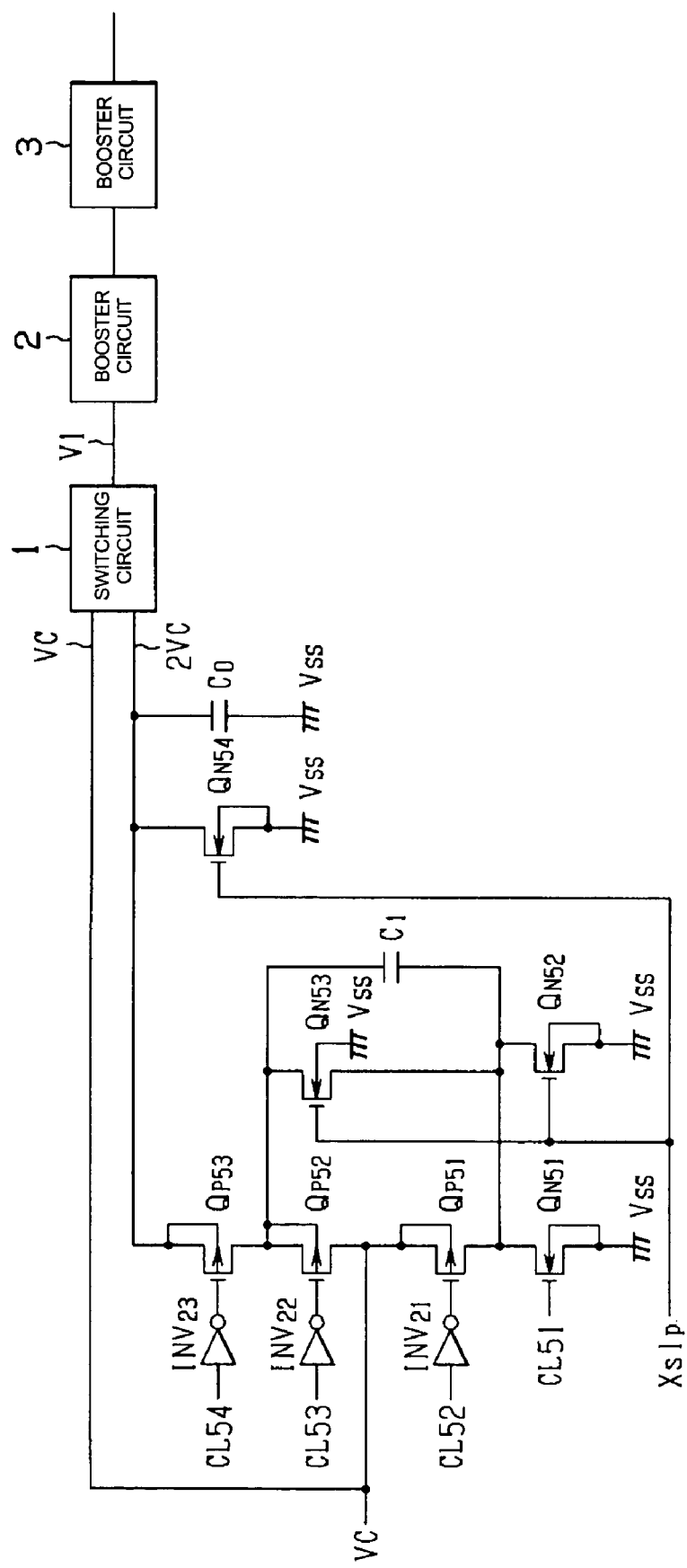
FIG. 15 is a structural diagram that shows a circuit for generating segment voltage for non-bias by using the structure in FIG. 14.

FIG. 14 is a diagram of a double stage booster circuit with a positive direction for generating the segment voltage V1. FIG. 15 shows a circuit for generating a segment voltage for the non-bias state by using the circuit in FIG. 14. In FIG. 14, the P channel transistor QP51 and the N channel transistor QN51 are serially connected between the source voltage VC at the high potential side and the reference potential VSS at the low potential side.

The clock signal CL52 is supplied to the gate of the P channel transistor QP51 from the control means via the inverter INV21 and the source voltage VC (=1.3V) is input into the source of it. The clock signal CL51 is supplied to the gate of the N-channel transistor QN51.

In addition, the P channel transistors QP52 and QP53 are serially connected to the source voltage VC (=1.3V). The clock signals CL53 and CL54 are supplied to each gate of the transistors QP52 and QP53 via the inverters INV22 and INV23.

The capacitor C1 is connected to the common junction point (the drain) of the transistor QP51 with the transistor QN51 and the source of the transistor QP52. The stabilizing capacitor C0 is connected to the output terminal (source) of the P channel transistor QP53 and the reference potential VSS. Then, the double boosted voltage V1 (=2VC) is output from the stabilizing capacitor C0.

The clock signal CL51 of the transistor QN51 and the clock signal CL53 of the transistor QP52 are in-phase each other. In addition, the clock signal CL52 of the transistor QP51 and the clock signal CL54 of the transistor QP53 are in-phase each other. The clock signals CL51 and CL53 and the clock signals CL52 and CL54 are out of phase with each other. Each of the clock signals CL51 to CL54 is a rectangular wave pulse with a predetermined frequency (50 kHz, for example) and a 50% duty cycle.

In the above circuit, at first, when the transistors QN51, QP52 are turned "on" during the half period of the clock signals CL51 and CL53, the capacitor C1 is charged based on the power source voltage VC (=1.3V). Then, the transistors QN51 and the QP51 are turned "off" and the transistors QN51 and the QP51 and QP53 are turned "on" so as to add the charged voltage (=VC) of the capacitor C1 to the power source voltage VC. Thus, the double boosted voltage 2VC (=V1=2.6V) is output to the stabilizing capacitor C0.

FIG. 15 shows a circuit for generating the 2.6V that is essentially needed for the segment voltage V1 and the 1.3V that is needed to generate the non-bias state at the time the display is "off".

In the circuit of FIG. 15, the input voltage VC (=1.3V) of the double booster circuit for a positive direction and output voltage 2VC (=V1=2.6V) are switched by the switching circuit 1 so as to change the size of the segment voltage V1 between 2.6V and 1.3V. In addition, the N-channel transistor QN53 connected to the capacitor C1 in parallel, the N-channel transistor QN52 connected to the end of the capacitor C1 and the reference potential VSS, the N-channel transistor QN54 connected to the stabilizing capacitor C0 are disposed to remove charge in the capacitors C1 and C0 before cutting off the power source of the system. This is to avoid leaving charge in the capacitors C1 and C0 (namely applying DC voltage to a liquid crystal) after cutting off the power source of the system.

Thus, in order to form the non-bias state in a liquid crystal at the time the display is "off", one of the VC and 2VC is selected by the switching circuit 1 shown in FIG. 15 so as to be the segment voltage V1. Therefore, the effect of the output impedance of the switching circuit 1 provided with transistors is increased as described in the circuitry of FIG. 4. For example, when the booster circuits 2 and 3 are cascade-connected at the latter stage of the switching circuit 1, the effect of the output impedance is proportional to the square of the boosted multiples so as to be extremely large.

Figure 16:
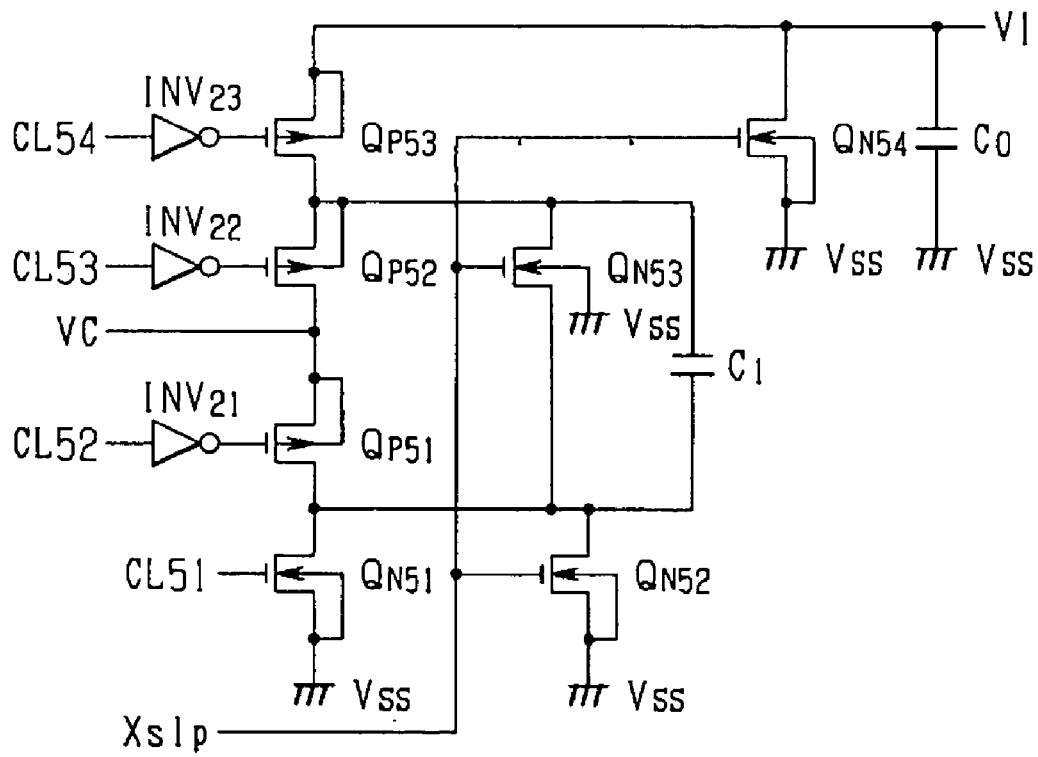
FIG. 16 is a circuit diagram that shows a power source circuit of the sixth embodiment of the present invention.

FIG. 16 is a circuit diagram that shows a power source circuit of a sixth embodiment of the present invention.

In this sixth embodiment of the present invention, 2VC (=2.6V) and VC (=1.3V) can be output as the segment voltage V1 based on the source voltage VC without installing a particular switching circuit.

The power source circuit in FIG. 16 has the same structure as the circuit shown in FIG. 15 (the transistors QN51 to QN54, QP51 to QP53, the inverters INV21 to INV23, the double booster circuit with the capacitors C1 and C0). The difference from structure in FIG. 15 is as follows. In case of outputting the segment voltage V1 which is equivalent to the power source voltage VS, after removing charge in the capacitors C1 and C0 by turning the transistors QN52 to QN54 "on", the gate voltage of each transistor is controlled such that a part of transistors QN51, QP51 and QP53 are fixed to be in an "on" state and the rest of transistors are fixed to be in an "off" state.

The circuit operation regarding FIG. 16 is described with reference to the timing charts in FIG. 17 and FIG. 18.

Figure 17:
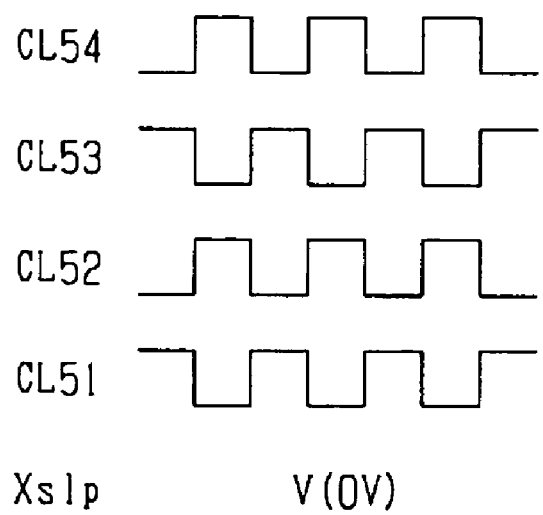
FIG. 17 is a timing chart that shows a circuit operation in FIG. 16.

When obtaining 2VC as the segment voltage V1, a clearing signal X slp is at a L level as shown in FIG. 17 and the clock signals CL51 to CL54 are normally supplied so as to operate a normal boosting function in the double booster circuit in FIG. 16 to obtain V1=2VC.

In addition, when obtaining VC as the segment voltage V1, as shown in FIG. 18, after a normal boosting operation, all clock signals CL51 to CL54 come to be at a L level and the transistors QN51 and Q51 and QP53 are turned "off" (it is enough to turn only transistors QP51 and QP52 "off" precisely). Under such state, the charging of the capacitors C1 and C0 are removed by setting the clearing signal X slp to be at a H level during a specific time. Then, the clock signals CL51, CL53 and CL54 areset at a H level and the clock signal CL52 is set at a L level so as to fix the transistors QN51 and Q52 and QP53 to be at an "on" state and the transistor QP51 to beat an "off" state to obtain V1=VC.

According to the above mentioned sixth embodiment, there is no need of using the switching circuit as shown in FIG. 15 such that there is no effect of the output impedance.

The present invention is not limited to the above mentioned embodiments and can be applied to any modifications within the spirit of the present invention.

According to the present invention, it is possible to realize a power source circuit where input voltages to a booster circuit can be switched without using a switching circuit and the effect of the output impedance in the booster circuit can be reduced as much as it can.

What is claimed is:

1. A power source circuit comprising:
    a power source wiring at a high potential side provided with a first power source voltage and a second power source voltage;
    a power source wiring at a low potential side;
    a booster circuit as a charge pump installed between the power source wiring at a high potential side and the power source wiring at a low potential side and provided with a plurality of switching transistors and a plurality of capacitors; and
    means for controlling the booster circuit,
    wherein a predetermined number of power sources including the power source wiring at the high potential side are further provided with the power source circuit,
    wherein an input voltage is selectively input to a part of the booster circuit from any one of the predetermined number of power sources, the means for controlling fixes all of the switching transistors inputting the predetermined number of power sources except one of the switching transistors; and
    wherein the means for controlling controls the booster circuit to implement a boosting operation by switching the switching transistor not fixed with a predetermined frequency and a predetermined phase relationship so as to switch the input of the predetermined number of power sources and selectively output a predetermined number of output voltages from the booster circuit.

2. The power source circuit according to claim 1 further comprising a multi stage booster circuit having multiple boosting stages, wherein a number of the multiple stages are decreased by short circuiting an output terminal of the multi stage booster circuit with an output terminal of a capacitor at least constituting a final stage of the multistage booster circuit and removing the capacitor.

3. The power source circuit according to claim 1 further comprising a multi stage booster circuit having multiple boosting stages, wherein an output terminal of a capacitor in at least one stage except the final stage of the multi stages booster circuit is connected to an output capacitor via one of the plurality of switching transistors so as to fetch out the potential of the stage as a stabilized potential from the output capacitor.

4. The power source circuit according to claim 1, wherein the plurality of switching transistors includes a first N-channel transistor and a first P-channel transistor connected in series between the first power source voltage at the high potential side and the power source wiring.

5. The power source circuit according to claim 4, wherein the plurality of switching transistors includes a second N-channel transistor and a second P-channel transistor connected in series in parallel with the series connection of the first P-channel transistor and the first N-channel transistor.

6. The power source circuit according to claim 5, wherein the first P-channel transistor is an input for the first power source voltage.

7. The power source circuit according to claim 5, wherein the first power source voltage is supplied to the second P-channel transistor.

8. The power source circuit according the claim 5, wherein the plurality of switching transistors includes a third P-channel transistor connected in parallel with the first P-channel transistor.

9. The power source circuit according to claim 8, wherein the third P-channel transistor is an input for the second power source voltage.

10. A power source circuit comprising:
a power source wiring at a high potential side provided with a first power source voltage and a second power source voltage;
a power source wiring at a low potential side;
a booster circuit as a charge pump installed between the power source wiring at a high potential side and the power source wiring at a low potential side and provided with a plurality of switching transistors and a plurality of capacitors, where one of the first power source voltage and the second power source voltage is switched and inputted to a part of the booster circuit and a first output voltage or a second output voltage, which are boosted based on the first power source voltage or the second power source voltage respectively, is outputted, and
means for controlling that controls fixing some of the plurality of switching transistors, which inputs the first power source voltage or the second power source voltage, among the switching transistors of the booster circuit to be at an "off" state, and switching the other transistors with a predetermined frequency so as to make the booster circuit implement a boosting operation and the booster circuit outputs the first output voltage or the second output voltage by switching and inputting one of the first power source voltage and a second power source voltage to a part of the booster circuit.

11. The power source circuit according to claim 10, further comprising a multi stage booster circuit having multiple boosting stages, wherein a number of the multiple stages are decreased by short circuiting an output terminal of the multi stage booster circuit with an output terminal of a capacitor at least constituting a final stage of the multistage booster circuit and removing the capacitor.

12. The power source circuit according to claim 10 further comprising a multi stage booster circuit having multiple boosting stages, wherein an output terminal of a capacitor in at least one stage except the final stage of the multi stages booster circuit is connected to an output capacitor via one of the plurality of switching transistors so as to fetch out the potential of the stage as a stabilized potential from the output capacitor.

13. The power source circuit according to claim 10, wherein the plurality of switching transistors includes a first N-channel transistor and a first P-channel transistor connected in series between the first power source voltage at the high potential side and the power source wiring.

14. The power source circuit according to claim 13, wherein the plurality of switching transistors includes a second N-channel transistor and a second P-channel transistor connected in series.

15. The power source circuit according to claim 14, wherein the first P-channel transistor is connected to the second P-channel transistor in parallel.

16. The power source circuit according to claim 13, wherein the first P-channel transistor receives the first power source voltage.

17. The power source circuit according to claim 13, wherein the plurality of switching transistors include a third P-channel transistor that receives the second power source voltage.

18. A power source circuit comprising:
a power source wiring at a high potential side provided with a first power source voltage and a second power source voltage;
a power source wiring at a low potential side;
a multi stage booster circuit as a charge pump installed between the power source wiring at a high potential side and the power source wiring at a low potential side and provided with a plurality of switching transistors and a plurality of capacitors to generate an output voltage, which are multistage-boosted based on the first power source voltage or the second power source voltage at the high potential side; and
means for controlling that controls the booster circuit to implement a boosting operation by switching the plurality of the switching transistors in the booster circuit with a predetermined frequency and a predetermined phase relationship,
wherein a number of multiple stages of the multi stage booster circuit decreases by short circuiting an output terminal of the multi stage booster circuit with a output terminal of a capacitor at least constituting a final stage of the multi stage booster circuit and removing the capacitor.

19. A power source circuit comprising:
a power source wiring at a high potential side provided with a first power source voltage and a second power source voltage;
a power source wiring at a low potential side;
a multi stage booster circuit as a charge pump installed between the power source wiring at a high potential side and the power source wiring at a low potential side and provided with a plurality of switching transistors and a plurality of capacitors to generate a output voltage, which are multistage-boosted based on the first power source voltage or second power source voltage at the high potential side; and means for controlling the multi booster circuit to boost a voltage by switching the plurality of switching transistors in the multi stage booster circuit with a predetermined frequency and a predetermined phase relationship, wherein an output terminal of a capacitor in at least one stage of the multi stage booster circuit except a final stage of the multi stage booster circuit is connected to an output capacitor so as to fetch out a potential of the at least one stage as a stabilized potential from the output capacitor.

20. A power source circuit comprising:

a power source wiring at a high potential side provided with a first power source voltage and a second power source voltage;

a power source wiring at a low potential side;

a booster circuit as a charge pump installed between the power source wiring at a high potential side and the power source wiring at a low potential side and provided with a plurality of switching transistors and a plurality of capacitors; and means for controlling that controls the booster circuit to implement a boosting operation by switching the plurality of the switching transistors with a predetermined frequency and a predetermined phase relationship, outputting a first output voltage and fixing some of the plurality of switching transistors to be at an "on" state and the rest of the plurality of switching transistors to be at an "off" state so as to make the booster circuit output a second output voltage which is equivalent to the power source voltage at the high potential side.

* * * * *